US012466847B2

(12) United States Patent
Lee et al.

(10) Patent No.: US 12,466,847 B2
(45) Date of Patent: Nov. 11, 2025

(54) SILAZANE-BASED COMPOUND, COATING COMPOSITION COMPRISING SAME, LIGHT-TRANSMITTING FILM HAVING COATING LAYER, AND DISPLAY DEVICE COMPRISING LIGHT-TRANSMITTING FILM

(71) Applicants: KOLON INDUSTRIES, INC., Seoul (KR); DCT MATERIAL LLC, Jincheon-gun (KR)

(72) Inventors: Geun Su Lee, Suwon (KR); Hak-Yong Woo, Seoul (KR); Jong Hyeon Cheon, Yongin (KR)

(73) Assignees: KOLON INDUSTRIES, INC., Seoul (KR); DCT MATERIAL LLC, Jincheon-gun (KR)

( * ) Notice: Subject to any disclaimer, the term of this patent is extended or adjusted under 35 U.S.C. 154(b) by 510 days.

(21) Appl. No.: 18/000,968

(22) PCT Filed: Jun. 22, 2021

(86) PCT No.: PCT/KR2021/007829
§ 371 (c)(1),
(2) Date: Dec. 7, 2022

(87) PCT Pub. No.: WO2021/261889
PCT Pub. Date: Dec. 30, 2021

(65) Prior Publication Data

US 2023/0147233 A1 May 11, 2023

(30) Foreign Application Priority Data

Jun. 26, 2020 (KR) ........................ 10-2020-0078314
Jun. 22, 2021 (KR) ........................ 10-2021-0080579

(51) Int. Cl.

| | |
|---|---|
| ***C09D 7/63*** | (2018.01) |
| ***C07F 7/18*** | (2006.01) |
| ***C08J 7/06*** | (2006.01) |
| ***C09D 183/14*** | (2006.01) |

(52) U.S. Cl.
CPC ............. *C07F 7/1804* (2013.01); *C08J 7/065* (2013.01); *C09D 7/63* (2018.01); *C09D 183/14* (2013.01); *C08J 2379/08* (2013.01)

(58) Field of Classification Search
None
See application file for complete search history.

(56) References Cited

U.S. PATENT DOCUMENTS

2021/0340439 A1* 11/2021 Sugiuchi ................ H10K 85/50

FOREIGN PATENT DOCUMENTS

| | | | |
|---|---|---|---|
| JP | H09-92034 | A | 4/1997 |
| JP | 2002-293941 | A | 10/2002 |
| JP | 2004-532318 | A | 10/2004 |
| JP | 2012-181334 | A | 9/2012 |
| KR | H05238827 | A | 9/1993 |
| KR | 2005036089 | A | 2/2005 |
| KR | 20070086078 | A | 8/2007 |
| KR | 10-0854254 | B1 | 8/2008 |
| KR | 20140128638 | A | 11/2014 |
| KR | 20180072265 | A | 6/2018 |
| KR | 20190060570 | A | 6/2019 |
| WO | 2003087228 | A1 | 10/2003 |
| WO | 2020120006 | A1 | 6/2020 |

OTHER PUBLICATIONS

Facile Synthesis of Fluorinated Polysilazanes and Their Durable Icephobicity on Rough AI Surfaces, Lo, Tien N.H. et al.
The office action dated Jan. 23, 2024 related to the corresponding Japanese Patent application.

* cited by examiner

*Primary Examiner* — Sheeba Ahmed
(74) *Attorney, Agent, or Firm* — Harvest IP Law, LLP

(57) ABSTRACT

Disclosed are a silazane-based compound represented by Formula 1, a coating composition containing the silazane-based compound, a light-transmitting film including a first coating layer containing the silazane-based compound, and a display apparatus including the light-transmitting film.

[Formula 1]

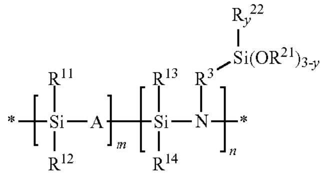

15 Claims, 6 Drawing Sheets

SILAZANE-BASED COMPOUND, COATING COMPOSITION COMPRISING SAME, LIGHT-TRANSMITTING FILM HAVING COATING LAYER, AND DISPLAY DEVICE COMPRISING LIGHT-TRANSMITTING FILM

CROSS REFERENCE TO RELATED APPLICATION(S)

This application is a National Stage of International Application No. PCT/KR2021/007829 filed Jun. 22, 2021, claiming priority based on Korean Patent Application No. 10-2020-0078314 filed Jun. 26, 2020 and Korean Patent Application No. 10-2021-0080579 filed Jun. 22, 2021, the disclosures of which are incorporated herein by reference in their entireties.

TECHNICAL FIELD

The present disclosure relates to a silazane-based compound, a coating composition comprising the same, a transparent film having a coating layer, and a display apparatus comprising the light-transmitting film.

BACKGROUND ART

Recently, a flexible display apparatus capable of being folded or bent has been attracting great attention as a next-generation display. Such a flexible display apparatus includes a display panel that can be folded or bent and a cover window for protecting the display panel. The cover window requires excellent hardness, low moisture permeability, chemical resistance, and excellent light transmittance in order to protect a device disposed on the display panel.

Various transparent plastic films are being researched as materials for the cover window of the flexible display apparatus. Among transparent plastics, a polyimide-based film having high hardness is being researched as a material for the cover window of the flexible display apparatus.

The polyimide-based film has the advantage of being capable of simultaneously realizing both high hardness and small thickness. However, the optical and mechanical properties of the polyimide-based film may not satisfy the physical properties required for various flexible display apparatuses. Therefore, in order to improve the physical properties of the polyimide-based film, monomers and additives are being developed, and various coating layers are being researched.

DISCLOSURE

Technical Problem

Therefore, the present disclosure has been made in view of the above problems, and it is one object of the present disclosure to provide a silazane-based compound that can be used to improve the physical properties of a transparent or light-transmitting film.

It is another object of the present disclosure to provide a coating composition containing the silazane-based compound.

It is another object of the present disclosure to provide a light-transmitting film having a coating layer formed using the coating composition containing the silazane-based compound.

It is another object of the present disclosure to provide a display apparatus including the light-transmitting film.

Technical Solution

In accordance with the present disclosure, the above and other objects can be accomplished by the provision of a silazane-based compound represented by the following Formula 1:

[Formula 1]

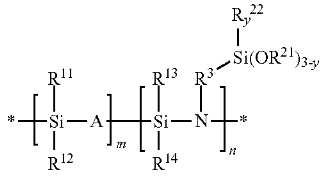

wherein, in Formula 1, $R^{11}$, $R^{12}$, $R^{13}$ and $R^{14}$ are each independently selected from hydrogen, an alkyl group having 1 to 20 carbon atoms, an alkoxy group having 1 to 20 carbon atoms, an aryl group having 6 to 18 carbon atoms, an alkyl acrylate group having 3 to 20 carbon atoms, an alkyl methacrylate group having 4 to 20 carbon atoms, an alkyl vinyl group having 3 to 20 carbon atoms, and a vinyl group, $R^{21}$ is selected from hydrogen, an alkyl group having 1 to 10 carbon atoms, an aryl group having 6 to 18 carbon atoms, and a vinyl group, $R^{22}$ is selected from hydrogen, an alkyl group having 1 to 10 carbon atoms, an aryl group having 6 to 18 carbon atoms, and a vinyl group, $R^3$ is selected from a single bond, an alkylene group having 1 to 10 carbon atoms, an arylene group having 6 to 18 carbon atoms, a substituted alkylene group having 2 to 20 carbon atoms, a substituted arylene group having 7 to 19 carbon atoms, an alkylene vinyl group having 3 to 20 carbon atoms, a vinyl group and a heteroalkylene group having 1 to 10 carbon atoms, m and n are each an integer of 5 to 150, and the m/(m+n) is 0.2 to 0.98, y is an integer of 0 to 2, and "A" in Formula 1 is represented by the following Formula 2:

[Formula 2]

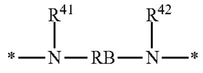

wherein, in Formula 2, $R^{41}$ and $R^{42}$ are each independently selected from hydrogen and an alkyl group having 1 to 4 carbon atoms, and RB is a divalent compound having a cyclic group.

RB may be represented by any one of the following Formula 3 to Formula 12:

[Formula 3]

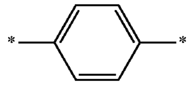

-continued
[Formula 4]
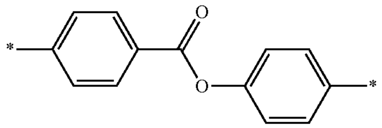
[Formula 5]
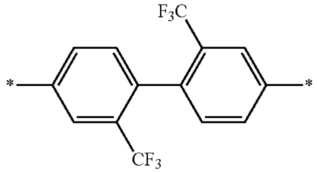
[Formula 6]
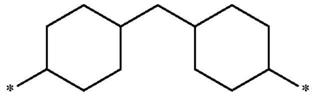
[Formula 7]
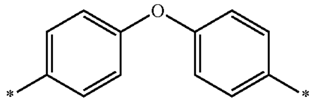
[Formula 8]
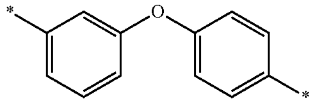
[Formula 9]
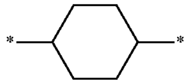
[Formula 10]
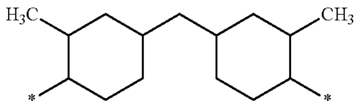
[Formula 11]
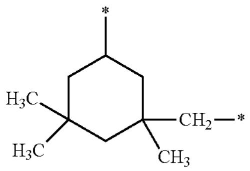
[Formula 12]
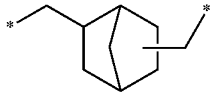
In Formula 1, A may be represented by any one of the following Formula 13 to Formula 22:
[Formula 13]
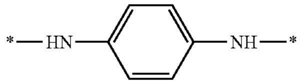
[Formula 14]
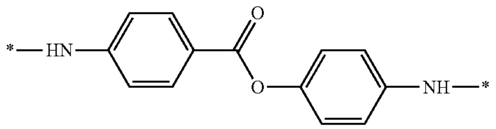
-continued
[Formula 15]
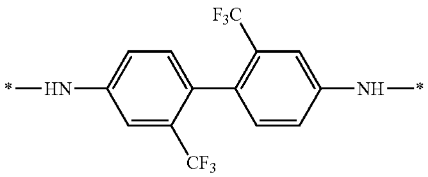
[Formula 16]
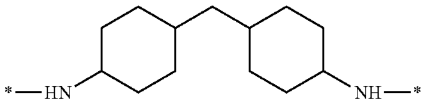
[Formula 17]
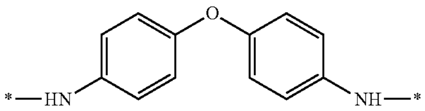
[Formula 18]
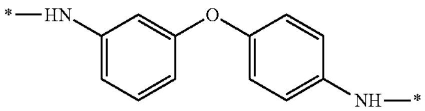
[Formula 19]
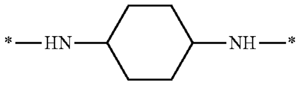
[Formula 20]
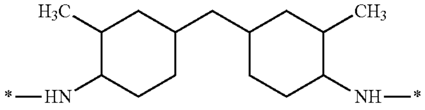
[Formula 21]
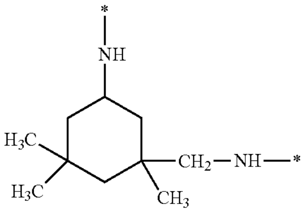
[Formula 22]
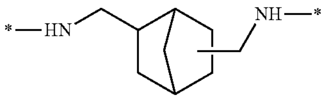
Formula 1 may be represented by any one of the following Formula 23 to Formula 31:
[Formula 23]
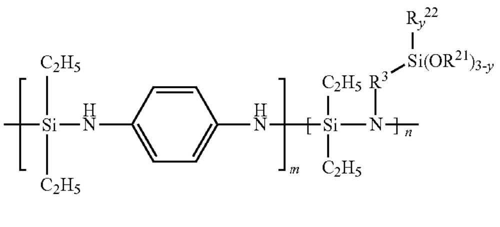

-continued

[Formula 24]

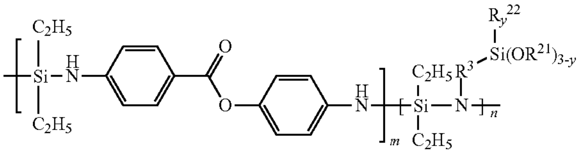

[Formula 25]

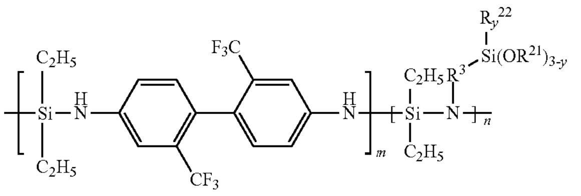

[Formula 26]

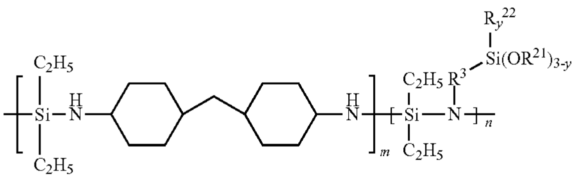

[Formula 27]

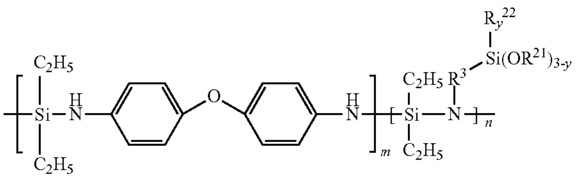

[Formula 28]

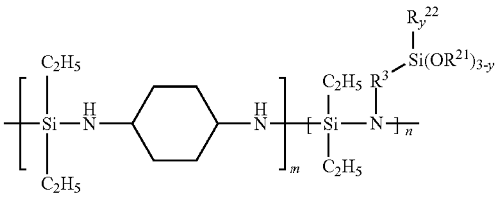

[Formula 29]

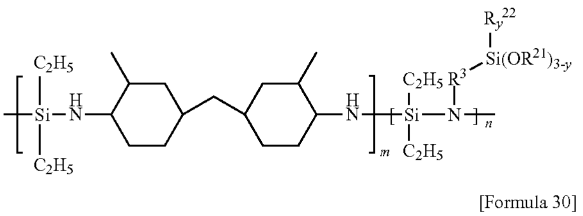

[Formula 30]

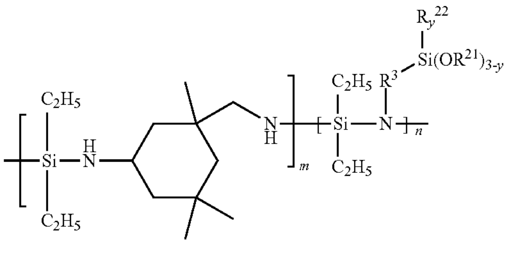

-continued

[Formula 31]

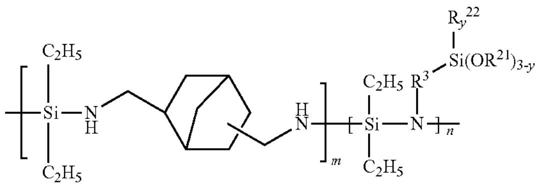

$R^3$ may be represented by any one of the following Formula 32 to Formula 38:

[Formula 32]

$$*\!-\!(CH_2)_{p1}\!-\!*$$

[Formula 33]

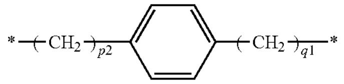

[Formula 34]

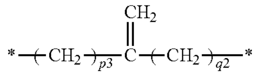

[Formula 35]

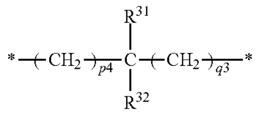

[Formula 36]

$$*\!-\!(CH_2)_{p5}\!-\!NH\!-\!(CH_2)_{q4}\!-\!*$$

[Formula 37]

$$*\!-\!(CH_2)_{p6}\!-\!O\!-\!(CH_2)_{q5}\!-\!*$$

[Formula 38]

$$*\!-\!(CH_2)_{p7}\!-\!S\!-\!(CH_2)_{q6}\!-\!*$$

wherein $p^1$ is an integer from 0 to 10, wherein Formula 32 represents a single bond, when $p^1$ is 0; $p^2$, $p^3$, $p^4$, $p^5$, $p^6$, $p^7$, $q^1$, $q^2$, $q^3$, $q^4$, $q^5$ and $q^6$ are each independently an integer of 0 to 6; $R^{31}$ and $R^{32}$ are each independently hydrogen or an alkoxy group having 1 to 5 carbon atoms; and at least one of $R^{31}$ or $R^{32}$ is an alkoxy group having 1 to 5 carbon atoms.

The silazane-based compound may have a weight average molecular weight (Mw) of 500 to 50,000 g/mol.

In accordance with another aspect of the present disclosure, there is provided a coating composition containing a silazane-based compound represented by the following Formula 1.

[Formula 1]

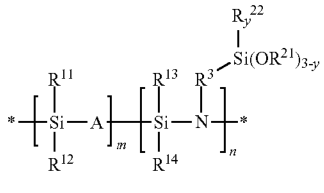

In accordance with another aspect of the present disclosure, there is provided a light-transmitting film including a support layer and a first coating layer on the support layer, wherein the first coating layer includes a cured product of a silazane-based compound represented by the following Formula 1:

[Formula 1]

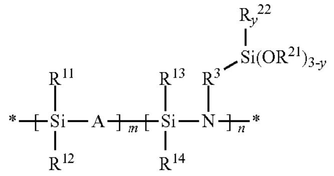

The first coating layer may have a thickness of 0.02 to 10 μm.

The light-transmitting film may have a yellow index of 1.5 or less.

The light-transmitting film may further include a second coating layer on the support layer, wherein the second coating layer includes a reaction product of a compound represented by the following Formula 39 and a compound represented by the following Formula 40:

[Formula 39]

$$R^5_k\text{—Si—}(OR^6)_{4-k}$$

[Formula 40]

$$M\text{—}(OR^7)_j$$

wherein $R^5$ in Formula 39 is derived from any one of linear, branched, alicyclic and aromatic organic compounds containing at least one of an epoxy group, an acrylic group, and an isocyanate group, each of $R^6$ in Formula 39 and $R^7$ in Formula 40 is a $C_1$ to $C_8$ linear, branched or alicyclic heteroalkyl group, M in Formula 40 is a metal element, k in Formula 39 is an integer of 1 to 3, and j in Formula 40 is an integer of 1 to 10.

In accordance with another aspect of the present disclosure, there is provided a display apparatus including a display panel and a light-transmitting film disposed on the display panel.

Advantageous Effects

The silazane-based compound according to an embodiment of the present disclosure may be used for a coating composition to improve the properties of the light-transmitting film. The silazane-based compound according to an embodiment of the present disclosure is, for example, used for a coating layer of a transparent plastic film such as a polyimide-based film to improve the adhesion and optical properties of a transparent plastic film such as a polyimide-based film.

BEST MODE

Figure 1:
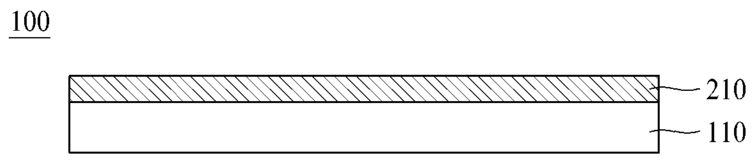
FIG. 1 is a cross-sectional view illustrating a light-transmitting film according to an embodiment of the present disclosure.

Hereinafter, embodiments of the present disclosure will be described in detail with reference to the accompanying drawings. However, the following embodiments are illustratively provided merely for clear understanding of the present disclosure, and do not limit the scope of the present disclosure.

The shapes, sizes, ratios, angles, and numbers disclosed in the drawings for describing embodiments of the present disclosure are merely examples, and the present disclosure is not limited to the illustrated details. Like reference numerals refer to like elements throughout the present specification. In the following description, when the detailed description of relevant known function s or configurations is determined to unnecessarily obscure important points of the present disclosure, the detailed description will be omitted.

In the case in which "comprise", "have", and "include" are used in the present specification, another part may also be present, unless "only" is used. Terms in a singular form may include the plural meanings unless noted to the contrary. Also, in construing an element, the element is to be construed as including an error range even if there is no explicit description thereof.

In describing a positional relationship, for example, when the positional relationship is described as "on", "above", "below", and "next", the case of no contact therebetween may be included, unless "just" or "directly" is used.

Spatially relative terms such as "below", "beneath", "lower", "above", or "upper" may be used herein to describe the relationship of a device or an element to another device or another element as shown in the figures. It will be understood that spatially relative terms are intended to encompass different orientations of a device during the use or operation of the device, in addition to the orientation depicted in the figures. For example, if a device in one of the figures is turned upside down, elements described as "below" or "beneath" other elements would then be positioned "above" the other elements. The exemplary term "below" or "beneath" can, therefore, encompass the meanings of both "below" and "above". In the same manner, the exemplary term "above" or "upper" can encompass the meanings of both "above" and "below".

In describing temporal relationships, for example, when the temporal order is described as "after", "subsequent", "next", and "before", the case of a non-continuous relationship may be included, unless "just" or "directly" is used.

It will be understood that, although the terms "first", "second", etc. may be used herein to describe various elements, these elements should not be limited by these terms. These terms are only used to distinguish one element from another. Therefore, a first element could be termed a second element within a technical idea of the present disclosure.

It should be understood that the term "at least one" includes all combinations related with any one item. For example, "at least one among a first element, a second element, and a third element" may include all combinations of two or more elements selected from among the first, second, and third elements, as well as each element of the first, second, and third elements.

Features of various embodiments of the present disclosure may be partially or completely coupled to or combined with each other, and may be variously interoperated with each other and driven technically, as will be easily understood by those skilled in the art. The embodiments of the present disclosure may be carried out independently from each other, or may be carried out together in an interrelated manner.

In one aspect, the present disclosure provides a silazane-based compound represented by the following Formula 1.

[Formula 1]

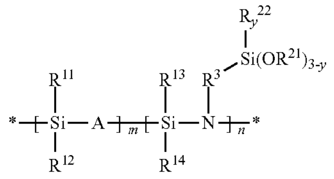

In Formula 1, $R^{11}$, $R^{12}$, $R^{13}$ and $R^{14}$ are each independently selected from hydrogen, an alkyl group having 1 to 20 carbon atoms, an alkoxy group having 1 to 20 carbon atoms, an aryl group having 6 to 18 carbon atoms, an alkyl acrylate group having 3 to 20 carbon atoms, an alkyl methacrylate group having 4 to 20 carbon atoms, an alkyl vinyl group having 3 to 20 carbon atoms, and a vinyl group.

$R^{21}$ is selected from hydrogen, an alkyl group having 1 to 10 carbon atoms, an aryl group having 6 to 18 carbon atoms, and a vinyl group. $R^{22}$ is selected from hydrogen, an alkyl group having 1 to 10 carbon atoms, an aryl group having 6 to 18 carbon atoms and a vinyl group. $R^{21}$ and $R^{22}$ may be the same as or different from each other.

$R^3$ is selected from a single bond, an alkylene group having 1 to 10 carbon atoms, an arylene group having 6 to 18 carbon atoms, a substituted alkylene group having 2 to 20 carbon atoms, a substituted arylene group having 7 to 19 carbon atoms, an alkylene vinyl group having 3 to 20 carbon atoms, a vinyl group, and a heteroalkylene group having 1 to 10 carbon atoms.

According to an embodiment of the present disclosure, the alkylene group is a divalent hydrocarbon group. For example, the alkylene group may be derived from an alkyl group, and may have two bonding positions.

According to an embodiment of the present disclosure, the arylene group is a divalent hydrocarbon group having an aromatic ring. For example, the arylene group may be derived from an aryl group and have two bonding positions.

According to an embodiment of the present disclosure, the substituted alkylene group refers to a compound group in which hydrogen of the alkylene group is substituted with another functional group. The substituted alkylene group includes, for example, an alkylene group substituted with an alkoxy group.

According to an embodiment of the present disclosure, the substituted arylene group refers to a compound group in which hydrogen of the arylene group is substituted with another functional group. The substituted arylene group includes, for example, an arylene group substituted with an alkoxy group.

According to an embodiment of the present disclosure, the alkylene vinyl group may have a structure in which a portion of an alkylene group is substituted with a vinyl group.

According to an embodiment of the present disclosure, the heteroalkylene group refers to an alkylene group in which one or more carbon atoms are substituted with a hetero atom, or a radical thereof. The term "heteroatom" refers to an atom other than carbon that takes the place of carbon. The heteroatom may, for example, include at least one of O, S, N, P, B, Si, or Se. More specifically, the heteroatom may include any one of O, S, or N.

m and n are each an integer of 5 to 150, and m/(m+n) is 0.2 to 0.98. In Formula 1, y is an integer of 0 to 2. More particularly, y is 0 or 1.

In Formula 1, "A" may be represented by the following Formula 2.

[Formula 2]

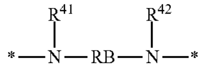

In Formula 2, $R^{41}$ and $R^{42}$ are each independently selected from hydrogen and an alkyl group having 1 to 4 carbon atoms, and RB has a cyclic group.

In one embodiment of the present disclosure, RB may be represented by any one of the following Formula 3 to Formula 12.

[Formula 3]

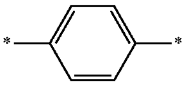

[Formula 4]

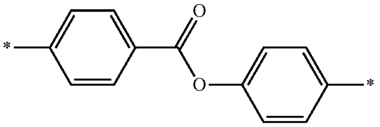

[Formula 5]

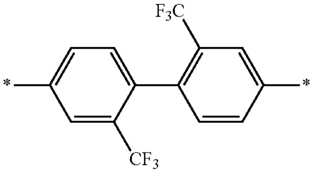

[Formula 6]

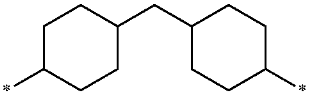

[Formula 7]

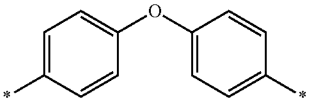

[Formula 8]

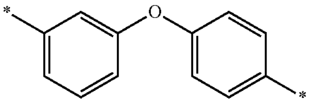

[Formula 9]

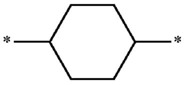

[Formula 10]

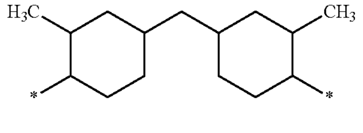

[Formula 11]

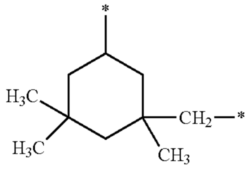

[Formula 12]

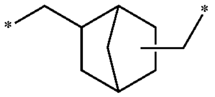

In addition, according to one embodiment of the present disclosure, in Formula 1, A may be represented by any one of the following Formula 13 to Formula 22.

[Formula 13]

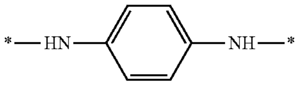

[Formula 14]

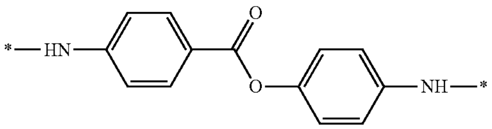

[Formula 15]

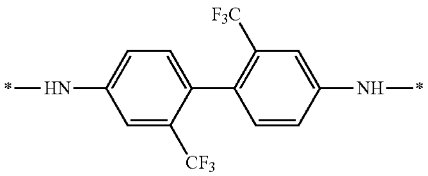

[Formula 16]

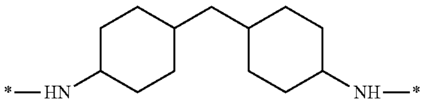

[Formula 17]

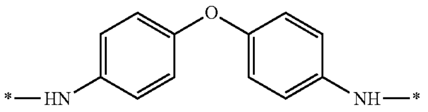

[Formula 18]

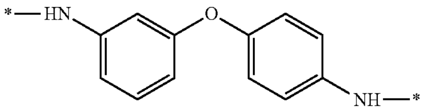

[Formula 19]

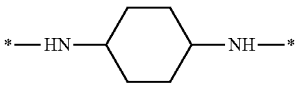

[Formula 20]

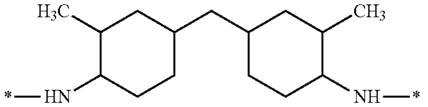

[Formula 21]

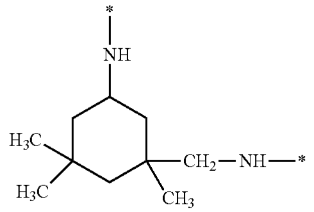

[Formula 22]

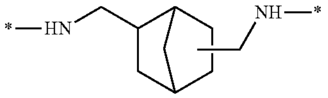

As such, "A" in Formula 1 may include a group derived from an aromatic compound or a group derived from an aliphatic cyclic compound. When "A" includes a cyclic compound, the main chain of the silazane-based compound may include the chain of the cyclic compound. As a result, the length of the repeating unit of the silazane-based compound is increased, and the silazane-based compound according to an embodiment of the present disclosure may have excellent flexibility.

According to one embodiment of the present disclosure, Formula 1 may be represented by any one of the following Formula 23 to Formula 31.

[Formula 23]

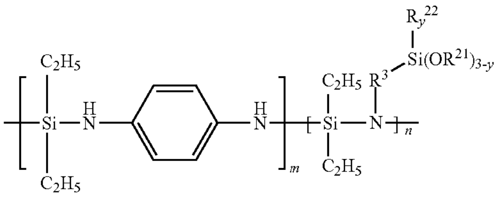

[Formula 24]

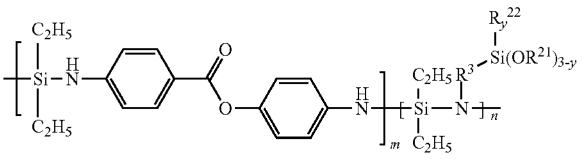

[Formula 25]

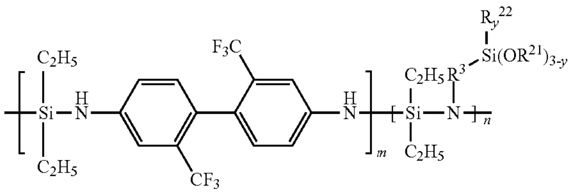

[Formula 26]

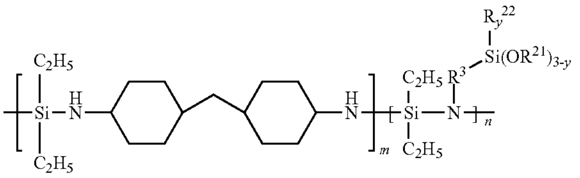

-continued

[Formula 27]

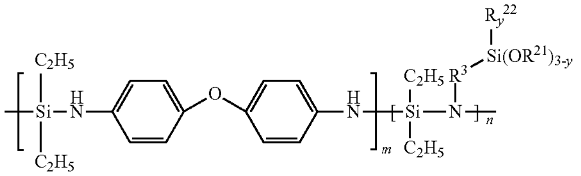

[Formula 28]

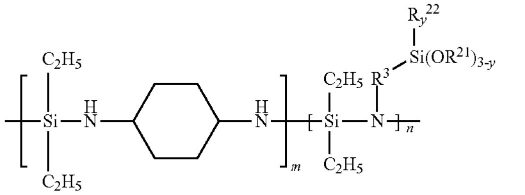

[Formula 29]

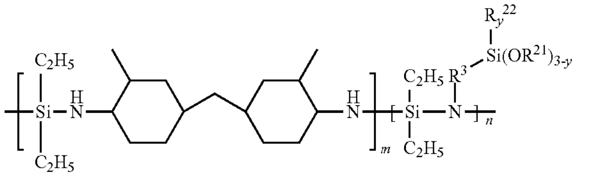

[Formula 30]

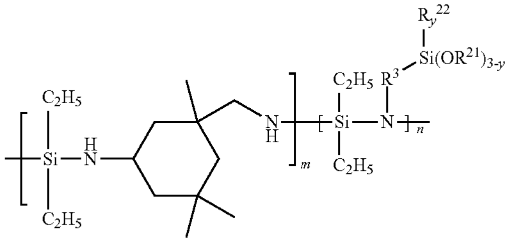

[Formula 31]

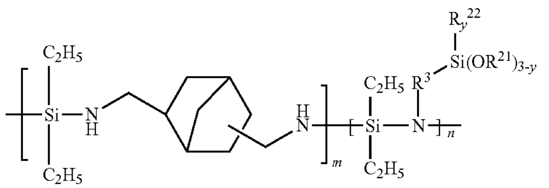

As can be seen above, the silazane-based compounds according to one embodiment of the present disclosure may be represented by the Formula 23 to Formula 31.

According to one embodiment of the present disclosure, $R^3$ may be represented by any one of the following Formula 32 to Formula 38.

[Formula 32]

$$*-(CH_2)_{p1}-*$$

[Formula 33]

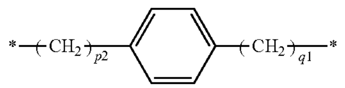

[Formula 34]

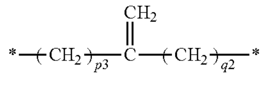

-continued

[Formula 35]

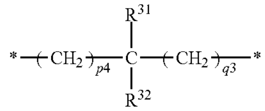

[Formula 36]

$$*-(CH_2)_{p5}-NH-(CH_2)_{q4}-*$$

[Formula 37]

$$*-(CH_2)_{p6}-O-(CH_2)_{q5}-*$$

[Formula 38]

$$*-(CH_2)_{p7}-S-(CH_2)_{q6}-*$$

In Formula 32, $p^1$ is an integer from 0 to 10. Formula 32 represents a single bond, when $p^1$ is 0.

$p^2$, $p^3$, $p^4$, $p^5$, $p^6$, $p^7$, $q^1$, $q^2$, $q^3$, $q^4$, $q^5$ and $q^6$ are each independently an integer of 0 to 6.

In Formula 35, $R^{31}$ and $R^{32}$ are each independently hydrogen or an alkoxy group having 1 to 5 carbon atoms. At least one of $R^{31}$ or $R^{32}$ is an alkoxy group having 1 to 5 carbon atoms. Formula 35 may represent an alkylene group substituted with an alkoxy group.

The silazane-based compound according to an embodiment of the present disclosure has a silazane (—Si—N—) bond. More specifically, the silazane-based compound according to an embodiment of the present disclosure is a polymer having a main chain including a silazane (—Si—N—) bond. The silazane-based compound according to an embodiment of the present disclosure has the silazane bond, thereby having high heat resistance. The silazane-based compound according to an embodiment of the present disclosure may be referred to as a "polysilazane-based compound" because it has a polymer structure.

The main chain of the silazane-based compound according to an embodiment of the present disclosure includes a cyclic compound. Specifically, "A" in Formula 1 may include a cyclic compound. When the main chain includes a chain of a cyclic compound, the length of the repeating unit may be increased. As a result, the silazane-based compound according to an embodiment of the present disclosure may have excellent flexibility.

In addition, the silazane-based compound according to an embodiment of the present disclosure may be crosslinked multiple times because it includes an alkoxysilane group at the side chain thereof. As a result, the resin or coating layer formed using the silazane-based compound according to an embodiment of the present disclosure may have excellent chemical resistance.

The silazane-based compound according to an embodiment of the present disclosure may be used as a coating composition to form a coating layer by curing.

In Formula 1, when m and n are less than 5, the molecular weight of the silazane-based compound is small, and thus it may not be easy to form a coating layer using the silazane-based compound. On the other hand, when m and n in Formula 1 exceed 150, the molecular weight of the silazane-based compound is excessively increased, and workability may be reduced in the process of forming a coating layer using the silazane-based compound. Accordingly, according to an embodiment of the present disclosure, each of m and n is an integer of 5 to 150.

In Formula 1, m/(m+n) is 0.2 to 0.98. When m/(m+n) is less than 0.2, disadvantageously, the flexibility and solubility of the silazane-based compound may be reduced. When m/(m+n) exceeds 0.98, the content of the alkoxysilane group grafted into the main chain may be reduced, and thus the chemical resistance of the coating layer formed using the silazane-based compound may be deteriorated.

The silazane-based compound may have a weight average molecular weight (Mw) of 500 to 50,000 g/mol. More specifically, the weight average molecular weight of the silazane-based compound according to an embodiment of the present disclosure may be 500 to 40,000, may be 2,000 to 20,000, may be 3,000 to 18,000, or may be 5,000 to 15,000. According to an embodiment of the present disclosure, the weight average molecular weight may be measured through gel permeation chromatography using a polystyrene standard. According to one embodiment of the present disclosure, the weight average molecular weight of the silazane-based compound may be adjusted to an extent such that the cured product can form a coating film.

The silazane-based compound according to an embodiment of the present disclosure may be prepared through reaction of a halogenated silane compound, an aminoalkyltrialkoxysilane compound, and an amine-based compound.

For example, the silazane-based compound according to an embodiment of the present disclosure may be prepared by the compounds represented by the following Formulas 41 to 44.

[Formula 41]

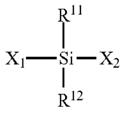

[Formula 42]

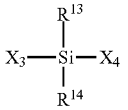

[Formula 43]

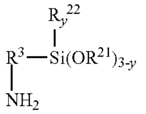

[Formula 44]

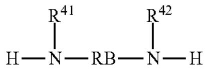

In Formulas 41 to 44, $R^{11}$, $R^{12}$, $R^{13}$, $R^{14}$, $R^{21}$, $R^{21}$, $R^3$, $R^{41}$, $R^{42}$ and RB are as defined above.

$X_1$ and $X_2$ in Formula 41 and $X_3$ and $X_4$ in Formula 42 are each independently a halogen element selected from fluorine (F), chlorine (Cl), bromine (Br), and iodine (I).

For example, a first repeating unit represented by Formula 45 may be formed through the reaction of the compound of Formula 41 with the compound of Formula 44.

[Formula 45]

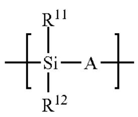

For example, a second repeating unit represented by Formula 46 may be formed through the reaction of the compound of Formula 42 with the compound of Formula 43.

[Formula 46]

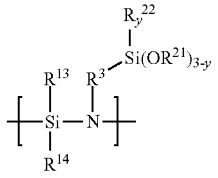

The molar ratio of the compound of Formula 41 to the compound of Formula 44 may be adjusted to 1:1 or about 1:1, and the molar ratio of the compound of Formula 42 to the compound of Formula 43 may be adjusted to 1:1 or about 1:1. When the molar ratio is adjusted within the range defined above, the content of residual monomers can be minimized, and the molecular weight of the prepared silazane-based compound can be easily controlled.

A solvent for preparing the silazane-based compound may be propylene glycol monomethyl ether acetate (PGMEA), N-methyl-2-pyrrolidone (NMP), dimethylacetamide (DMAc), n-butyl acetate, non-polar aromatic organic solvent such as benzene, toluene, or xylene, non-polar aliphatic organic solvent such as pentane, hexane, or heptane, or alkyl ether such as diisopropyl ether, dibutyl ether, or diethyl ether. The solvent may be used in an amount such that the total concentration of reactants in the solution ranges from about 5 to about 40% by weight, more specifically from about 5 to about 30% by weight.

In order to prepare the silazane-based compound according to an embodiment of the present disclosure, first, the compounds represented by Formulas 41 to 44 may be mixed and allowed to react with one another. There is no particular limitation as to the order of addition of the compounds represented by Formulas 41 to 44. For example, the compound of Formula 43 and the compound of Formula 44 are first added to and dissolved in a reaction solvent, and then the compound of Formula 41 and the compound of Formula 42 are slowly added dropwise thereto to control the reaction rate.

A violent reaction may occur in the process of preparing the silazane-based compound according to an embodiment of the present disclosure. For this reason, the reaction may be carried out under an inert atmosphere such as a nitrogen ($N_2$), argon (Ar), or helium (He) atmosphere at an initial reaction temperature of −20° C. to 0° C., more specifically −10° C. to 0° C., for about 1 to about 3 hours in order to control the reaction rate. Then, polymerization is carried out for about 3 to 20 hours while maintaining the reaction temperature at about 5° C. to 40° C. under an inert atmosphere, to increase the molecular weight of the silazane-based compound represented by Formula 1 having a polymer form and stabilize the properties of the polymer solution.

On the other hand, the reaction may be carried out in the presence of a basic compound for capturing hydrogen halide, for example, hydrogen chloride, hydrogen bromide, or the like, generated through a condensation reaction of the compound of Formula 41 and the compound of Formula 44 and a condensation reaction of the compound of Formula 42 and the compound of Formula 43. Any one may be used as the basic compound without any particular limitation, as long as it is capable of binding to hydrogen halide to form a salt. For example, the basic compound is a tertiary aliphatic amine compound such as trimethylamine or trimethylamine, or an aromatic amine compound such as pyridine.

According to an embodiment of the present disclosure, for example, a silazane-based compound may be prepared using the compounds represented by the following Formulas 47 to 49.

[Formula 47]

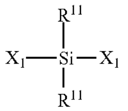

[Formula 48]

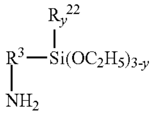

[Formula 49]

$H_2N—RB—NH_2$

In this case, the compound of Formula 47 may have the same function as the compound of Formula 41 and the compound of Formula 42.

In accordance with another aspect of the present disclosure, there is provided a coating composition containing the silazane-based compound represented by Formula 1.

The coating composition according to another embodiment of the present disclosure includes the silazane-based compound represented by Formula 1 and a solvent.

For example, when the composition for coating according to another embodiment of the present disclosure does not include an additive, the composition may include 1 to 50% by weight of the silazane-based compound represented by Formula 1 and 50 to 99% by weight of the solvent.

When the composition further includes an additive, the composition for coating according to another embodiment of the present disclosure may include 1 to 50% by weight of the silazane-based compound represented by Formula 1, 45 to 98.5% by weight of the solvent, and 0.1 to 5% by weight of the additive.

When the content of the solvent is less than 45% by weight based on the total weight of the coating composition, the coating composition is not uniformly applied, and thus there may be a difference in the thickness of the surface of the coating layer formed using the coating composition. When the content of the solvent is higher than 98.5% by weight based on the total weight of the coating composition, wettability may be deteriorated due to high surface tension, and thus a uniform film may not be formed.

The composition for coating according to another embodiment of the present disclosure may include 1 to 50% by weight of the silazane-based compound represented by Formula 1. In addition, in consideration of workability and viscosity when performing coating using the coating composition, the coating composition according to another embodiment of the present disclosure may include 1.5 to 30% by weight of the silazane-based compound represented by Formula 1.

The solvent for preparing the coating composition may be propylene glycol monomethyl ether acetate (PGMEA), N methyl-2-pyrrolidone (NMP), dimethylacetamide (DMAc), n-butyl acetate, benzene, toluene, xylene, dibutyl ether, diisopropyl ether, or a mixture thereof.

The coating composition may further include at least one additive selected from a curing agent, a release agent, a surfactant, an antioxidant, a metal particle, an oxide particle, and a nitride particle.

In addition, in order to facilitate polymerization and crosslinking, the coating composition may further include an acrylic compound.

The curing agent may be a thermal curing agent, and may be a latent thermal curing agent that does not cause curing at a low temperature but causes curing at a high temperature. The latent thermal curing agent may include an amine-type curing agent, an imidazole-type curing agent, a dihydrazide-type curing agent, organic peroxide, or the like. These may be used singly or as a mixture of two or more thereof. The latent thermal curing agent can generate acids, bases, or radicals at a certain temperature or higher. When the composition includes the latent thermosetting agent, crosslinking may be facilitated by an acid or a base, at the crosslinking site, particularly at a silicone alkoxy group.

The curing agent may be used in an amount of 0.1 to 5% by weight, more specifically 0.5 to 3% by weight, based on the total weight of the component (hereinafter, referred to as "solid") excluding the solvent in the coating composition. When the content of the curing agent is less than 0.1% by weight, curing may not proceed sufficiently, and when the content thereof is higher than 5% by weight, the coating layer may crack due to deteriorated storage stability and over-curing.

According to another embodiment of the present disclosure, the coating composition may further include a surfactant. The surfactant may improve the applicability of the composition for forming a coating layer. There is no particular limitation as to the type of surfactant. Examples of the surfactant include nonionic surfactants such as polyether-modified polydimethylsiloxane, polyester-modified polydimethylsiloxane, polyether-modified hydroxy-functional polydimethylsiloxane, polyether-ester-modified hydroxy-functional polydimethylsiloxane, acrylic functional polyester-modified polydimethylsiloxane, polyoxyethylene alkyl ether, polyoxyethylene octylphenyl ether, polyoxyethylene nonylphenyl ether, polyoxyethylene alkyl allyl ether, polyoxyethylene polyoxypropylene block copolymers, sorbitan fatty acid ester, and polyoxyethylene sorbitan fatty acid ester. The surfactant may be used in an amount of 0.01 to 0.1% by weight, more specifically 0.05 to 0.1% by weight, based on the total weight of the composition for forming a coating layer.

In another aspect, the present disclosure provides a light-transmitting film 100.

FIG. 1 is a cross-sectional view illustrating the light-transmitting film 100 according to another embodiment of the present disclosure.

The light-transmitting film 100 according to another embodiment of the present disclosure includes a support layer 110 and a first coating layer 210 on the support layer 110.

The support layer 110 is light-transmissive. In addition, the support layer 110 may be flexible. For example, the support layer 110 may exhibit at least one of bendability, foldability or rollability.

The support layer 110 may include a plastic film that is light-transmissive. The support layer 110 is, for example, a polyimide-based film. The polyimide-based film according to another embodiment of the present disclosure may be prepared from monomer components including dianhydride and diamine. More specifically, the polyimide-based film according to another embodiment of the present disclosure may have an imide repeating unit formed using dianhydride and diamine.

However, another embodiment of the present disclosure is not limited thereto, and the polyimide-based film may be prepared from monomer components further including a dicarbonyl compound, in addition to dianhydride and diamine. Accordingly, the polyimide-based film according to another embodiment of the present disclosure may have an imide repeating unit and an amide repeating unit. The polyimide-based film having the imide repeating unit and the amide repeating unit is, for example, a polyamide-imide film. The polyimide-based film according to another embodiment of the present disclosure includes a polyimide film and a polyamide-imide film. According to another embodiment of the present disclosure, the polyamide-based film may be used as the support layer 110.

According to an embodiment of the present disclosure, the polyimide-based film used as the support layer 110 has, for example, excellent heat resistance.

The thickness of the support layer 110 is not particularly limited. The support layer 110 may have a thickness sufficient for the light-transmitting film 100 to protect the display panel. For example, the support layer 110 may have a thickness of 10 to 100 μm.

According to another embodiment of the present disclosure, the support layer 110 may have an average light transmittance of 85% or more in the visible ray region measured with a UV spectrophotometer, based on a thickness of 10 to 100 μm, yellow index of 5 or less, and an average coefficient of thermal expansion (CTE) of 50.0 ppm/° C. or less measured at 50 to 250° C. in accordance with a TMA method.

The first coating layer 210 may be formed using the coating composition described above.

In accordance with one embodiment of the present disclosure, the first coating layer 210 includes a cured product of a silazane-based compound represented by the following Formula 1.

[Formula 1]

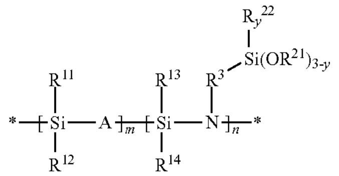

In Formula 1, $R^{11}$, $R^{12}$, $R^{13}$, $R^{14}$, $R^2$, R3, m, n and o are as defined above. In the silazane-based compound represented by Formula 1, the ratio of the first repeating unit represented by the following Formula 45 may be 2% to 98%, and the ratio of the second repeating unit represented by the following Formula 46 may be 98% to 2%.

[Formula 45]

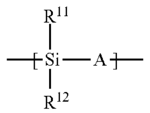

[Formula 46]

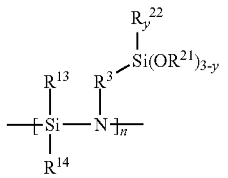

"A" in Formula 1 may be represented by the following Formula 2.

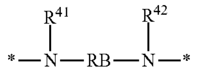

In Formula 2, $R^{41}$ and $R^{42}$ are as defined above, RB has a cyclic group and RB may be represented by any one of Formulas 3 to 12.

In addition, "A" in Formula 1 may be represented by any one of Formulas 13 to 22.

The cured product of the silazane-based compound according to another embodiment of the present disclosure may be produced by curing the silazane-based compound represented by Formula 1.

According to another embodiment of the present disclosure, the cured product of the silazane-based compound includes a three-dimensional transparent cured product formed through condensation between alkoxysilyl groups, among moieties derived from the aminoalkyltrialkoxysilane compound.

The cured product of the silazane-based compound represented by Formula 1 may have, for example, the structure represented by the following Formula 50.

[Formula 50]

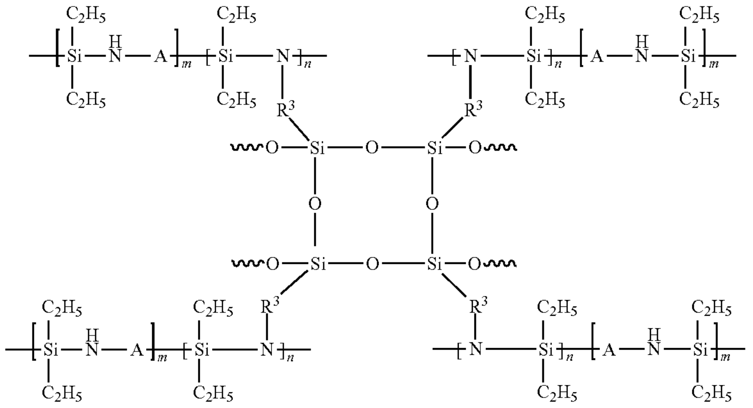

Formula 50 shows a two-dimensional version of the three-dimensional structure of the cured product of the silazane-based compound represented by Formula 1.

Referring to Formula 50, the cured product formed by curing the silazane-based compound represented by Formula 1 may include all of a silazane structure, a silsesquioxane structure, and a siloxane structure. Specifically, according to another embodiment of the present disclosure, the first coating layer 210 including the cured product of the silazane-based compound represented by Formula 1 has a silicon carbide (Si—C) structure, a silazane (Si—N) structure, a polysilsesquioxane (—$[RSiO_{1.5}]_n$—) structure, and a siloxane (Si—O) structure, and has many crosslinking sites, thereby forming an excellent crosslinked structure through curing.

Accordingly, the first coating layer 210 may have excellent transparency, solvent resistance, moisture-barrier properties and film stability. In addition, the light-transmitting film 100 including the first coating layer 210 may have excellent transparency, solvent resistance, chemical resistance, and moisture-barrier properties. In particular, the first coating layer 210 may remarkably reduce the yellow index of the light-transmitting film 100.

According to another embodiment of the present disclosure, control of film shrinkage resulting from volatilization of components caused by the alkoxy group or the OH group during the formation of the first coating layer 210 is maximized, and cracking of the first coating layer 210 can be effectively prevented.

According to another embodiment of the present disclosure, by controlling the ratio of the first repeating unit (Formula 45) and the second repeating unit (Formula 46) included in Formula 1, and controlling curing conditions in the process of forming the first coating layer 210, the first coating layer 210, having excellent chemical resistance, stability and flexibility while avoiding cracking, can be formed.

According to another embodiment of the present disclosure, the first coating layer 210 includes a derivative of the compound having the cyclic group represented by "A" of Formula 1, and thus the first coating layer 210 can exhibit excellent flexibility, compared to a coating layer produced only from siloxane or silazane.

In addition, when a phenyl group is present at the position A of Formula 1, the heat resistance of the light-transmitting film 100 can be improved.

In addition, when a cyclo-aliphatic structure is present at the position A of Formula 1, optical properties such as light transmittance or yellow index of the light-transmitting film 100 can be improved. For example, when the cyclo-aliphatic structure is present at the position A of Formula 1, light transmittance through the first coating layer 210 can be increased, and the overall light transmittance of the light-transmitting film 100 can be improved.

Specifically, the aliphatic ring structure does not absorb light in the wavelength range of 400 to 500 nm. For this reason, when the first coating layer 210 has an aliphatic ring structure, the light transmittance may be relatively high in the short wavelength range of 400 to 500 nm. As a result, when a cyclo-aliphatic structure is located at the position A of Formula 1, the light transmittance in the short wavelength band through the first coating layer 210 is increased and the intensity of the blue transmitted light is strengthened, and thus the yellow index of the light-transmitting film 100 may be reduced.

In addition, the first coating layer 210 may improve the surface properties of the light-transmitting film 100. For example, the first coating layer 210 may be disposed on the support layer 110 and serve as a primer layer for the support layer 110.

The first coating layer 210 is characterized by superior adhesion and superior interaction with other materials compared to the support layer 110. Therefore, when the first coating layer 210 is disposed on the support layer 110, the adhesion of the light-transmitting film 10 and interaction thereof with other materials are improved, compared to when the support layer 110 is used alone. As a result, the usability of the light-transmitting film 100 is improved.

According to another embodiment of the present disclosure, the first coating layer 210 may include an antistatic agent. The antistatic agent may, for example, include at least one of a conductive polymer, graphene, carbon nanotubes, or metal oxide.

According to another embodiment of the present disclosure, the first coating layer 210 may further include an ultraviolet (UV) absorber. Examples of the ultraviolet (UV) absorber may include benzotriazole-based UV absorbers, triazine-based UV absorbers, and the like.

The first coating layer 210 may include a pigment or dye. For example, the blue pigment or blue dye ma y reduce the yellow index of the first coating layer 210. Examples of the pigment or dye may include azo-based, phthalocyanine-based, quinacridone-based, benzimidazolone-based, isoindolinone-based, dioxazine-based, indanthrene-based, or perylene-based dyes or pigments.

In order to secure excellent hardness, flexibility, optical properties, solvent resistance, and moisture-barrier properties, the first coating layer 210 may have a thickness of 0.02 to 10 μm.

When the thickness of the first coating layer 210 is less than 0.02 μm, the solvent resistance and moisture-barrier properties of the light-transmitting film 100 may be deteriorated. On the other hand, when the thickness of the first coating layer 210 is higher than 10 μm, the flexibility and optical properties of the light-transmitting film 100 may be reduced, and the light-transmitting film 100 may curl. More specifically, the first coating layer 210 may have a thickness of 0.02 to 2 μm.

According to another embodiment of the present disclosure, the light-transmitting film 100 may have a yellow index, measured using a CM-3700D spectrophotometer in accordance with the ASTM E313 standard, of 2.5 or less. More specifically, the light-transmitting film 100 according to another embodiment of the present disclosure may have a yellow index of 1.5 or less, or may have a yellow index of 1.2 or less.

In addition, the light-transmitting film 100 according to another embodiment of the present disclosure may have an average light transmittance of 80 to 99% or 89 to 94% in the visible light region.

The first coating layer 210 may be produced from the coating composition containing the silazane-based compound represented by Formula 1. Since the coating composition has already been described above, a detailed description of the coating composition is omitted in order to avoid redundant description.

According to another embodiment of the present disclosure, the coating composition is applied onto the support layer 110 and is then cured to form the first coating layer 210.

The method of applying the coating composition onto the support layer 110 may include spray coating, bar coating, spin coating, dip coating, or the like. The coating composition applied onto the support layer 110 is dried to form the first coating layer 210.

After drying, the first coating layer 210 may be heat-treated at a temperature of 200 to 300° C. The film structure of the first coating layer 210 may be made more rigid through heat treatment, and as a result, the chemical resistance and heat resistance of the first coating layer 210 can be improved. When the heat treatment is performed at a temperature of less than 200° C., sufficient curing may not be achieved, and the degree of improvement in chemical resistance of the first coating layer 210 may be insufficient. When the heat treatment is performed at a temperature higher than 300° C., the yellow index (Y.I.) may increase. More specifically, the first coating layer 210 may be heat-treated at a temperature of 250 to 280° C.

Figure 2:
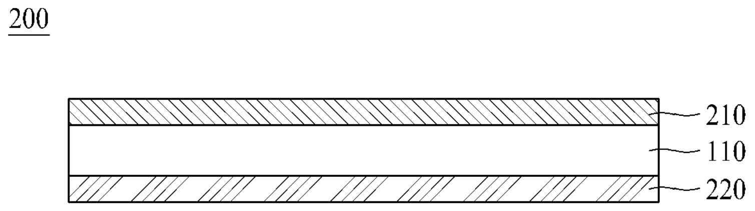
FIG. 2 is a cross-sectional view illustrating a light-transmitting film according to another embodiment of the present disclosure.

FIG. 2 is a cross-sectional view illustrating a light-transmitting film 200 according to another embodiment of the present disclosure.

The light-transmitting film 200 according to another embodiment of the present disclosure further includes a second coating layer 220 on the support layer 110. Specifically, the light-transmitting film 200 of FIG. 2 includes the first coating layer 210 on the support layer 110 and the second coating layer 220 on the support layer 110.

Referring to FIG. 2, the light-transmitting film 200 according to another embodiment of the present disclosure includes a second coating layer 220 disposed on the support layer 110 opposite the first coating layer 210.

Hereinafter, in order to avoid redundancy, descriptions of components that have been described above will be omitted.

According to another embodiment of the present disclosure, the second coating layer 220 may include a reaction product of a compound represented by the following Formula 39 and a compound represented by the following Formula 40.

$$R^5_K\text{—Si}(\text{—}OR^6)_{4-k}$$ [Formula 39]

$$M(\text{—}OR^7)_j$$ [Formula 40]

In Formula 39, $R^5$ is derived from any one of linear, branched, alicyclic, and aromatic organic compounds containing at least one of an epoxy group, an acrylic group, or an isocyanate group. Each of $R^6$ in Formula 39 and $R^7$ in Formula 40 is a $C_1$ to $C_8$ linear, branched or alicyclic heteroalkyl group.

According to another embodiment of the present disclosure, the term "heteroalkyl group" refers to an alkyl group or radical in which one or more carbon atoms are substituted with a heteroatom. The term "heteroatom" refers to an atom other than carbon that takes the place of carbon. The heteroatom may include at least one of O, S, N, P, B, Si, or Se. More specifically, the heteroatom may include any one of O, S, or N. For example, each of $R^6$ of Formula 39 and $R^7$ of Formula 40 is a heteroalkyl group including at least one of an oxygen atom (O) or a nitrogen atom (N) as the heteroatom.

k in Formula 39 is an integer of 1 to 3, and j in Formula 40 is an integer of 1 to 10.

M in Formula 40 is a metal element. The metal element M of Formula 40 is, for example, titanium (Ti), zinc (Zn), aluminum (Al), or the like.

The reaction product of the compound represented by Formula 39 and the compound represented by Formula 40 is, for example, a siloxane resin. According to an embodiment of the present disclosure, the second coating layer 220 is a hard coating layer. The second coating layer 220 is capable of improving the surface hardness and scratch resistance of the light-transmitting film 200 according to another embodiment of the present disclosure.

The siloxane resin for forming the second coating layer 220 may be prepared through polymerization of the alkoxysilane compound represented by Formula 39 alone, or through a reaction between the alkoxysilane compound represented by Formula 39 and the alkoxy metal compound represented by Formula 40.

The reaction of forming the siloxane resin for preparing the second coating layer 220 may be carried out at room temperature, or may be carried out at 50° C. to 120° C. in order to promote the reaction.

The light-transmitting film 200 including the second coating layer 220 serving as the hard coating layer may have a surface hardness, measured in accordance with the JIS K5600 standard, of 4H to 10H, and more specifically, 5H to 10H.

The light-transmitting film 200 including the second coating layer 220 according to another embodiment of the present disclosure is capable of exhibiting excellent flexibility as well as excellent surface hardness.

Even if the second coating layer 220 is disposed on the support layer 110, the yellow index of the light-transmitting film 200 may not be greatly increased, because the first coating layer 210 has excellent light transmittance and low yellow index.

The light-transmitting film 200 may have low moisture transmittance. For example, the light-transmitting film 200 according to another embodiment of the present disclosure may have water permeability, measured in accordance with ASTM E96BW, of 0.001 to 10 $g/m^2$*day or 0.001 to 3.1 $g/m^2$*day.

Since the light-transmitting film 200 according to another embodiment of the present disclosure has low water permeability, when the light-transmitting film 200 is used as a cover window of display apparatuses or electronic devices, it is capable of effectively protecting the internal components of display apparatuses or electronic devices from external humid environment s.

According to another embodiment of the present disclosure, in order to ensure excellent surface hardness, impact resistance and chemical resistance, the second coating layer 220 may have a thickness of 1 to 30 μm. When the thickness of the second coating layer 220 is less than 1 μm, strength, surface hardness, impact resistance, and chemical resistance may not be secured. When the thickness of the second coating layer 220 exceeds 30 μm, excessive stress or rigidity occurs in a bent or folded state, and in particular, bendability may be deteriorated. More specifically, the second coating layer 220 may have a thickness of 2 to 10 μm.

Figure 3:
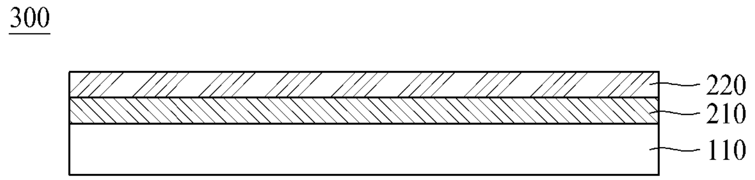
FIG. 3 is a cross-sectional view illustrating a light-transmitting film according to another embodiment of the present disclosure.

FIG. 3 is a cross-sectional view illustrating a light-transmitting film 300 according to another embodiment of the present disclosure.

Referring to FIG. 3, the second coating layer 220 may be disposed on the first coating layer 210. Specifically, the light-transmitting film 200 according to another embodiment of the present disclosure includes a second coating layer 220 on the first coating layer 210.

The second coating layer 220 shown in FIG. 3 may be formed in the same manner as the second coating layer 220 shown in FIG. 2.

Referring to FIG. 3, the first coating layer 210 disposed between the support layer 110 and the second coating layer 220 serves as a buffer layer between the support layer 110 and the second coating layer 220. As a result, the first coating layer 210 can enhance the flexibility of the second coating layer 220 and can improve coatability and adhesion between the support layer 110 and the second coating layer 220. Accordingly, even if the light-transmitting film 200 is bent, folded, or rolled, it is possible to prevent the second coating layer 220 from cracking.

Figure 4:
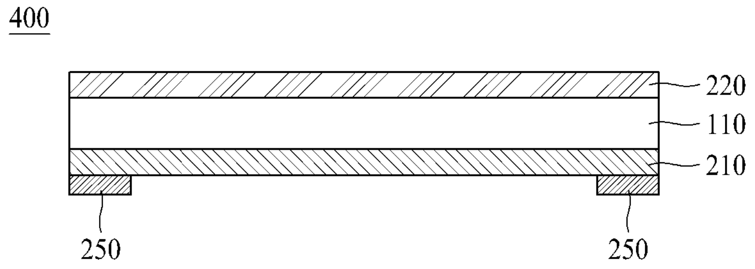
FIG. 4 is a cross-sectional view illustrating a light-transmitting film according to another embodiment of the present disclosure.

FIG. 4 is a cross-sectional view illustrating a light-transmitting film 400 according to another embodiment of the present disclosure.

Referring to FIG. 4, the light-transmitting film 400 according to another embodiment of the present disclosure includes a black matrix 250.

Specifically, the light-transmitting film 400 according to another embodiment of the present disclosure includes a support layer 110, a first coating layer 210 on one surface of the support layer 110, a black matrix 250 on the first coating layer 210, and a second coating layer 220 on the other surface of the support layer 110.

The black matrix 250 may serve as a light-blocking layer that blocks light. The black matrix 250 may, for example, be disposed so as to correspond to a bezel portion of the display apparatus, and may prevent the wiring inside the bezel portion from being visible to the outside.

Referring to FIG. 4, the black matrix 250 is disposed on the first coating layer 210. As a result, the black matrix 250 may stably maintain the attached state.

Figure 5:
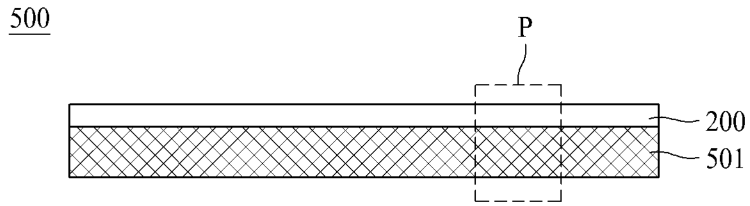
FIG. 5 is a cross-sectional view illustrating a part of a display apparatus according to another embodiment of the present disclosure.
Figure 6:
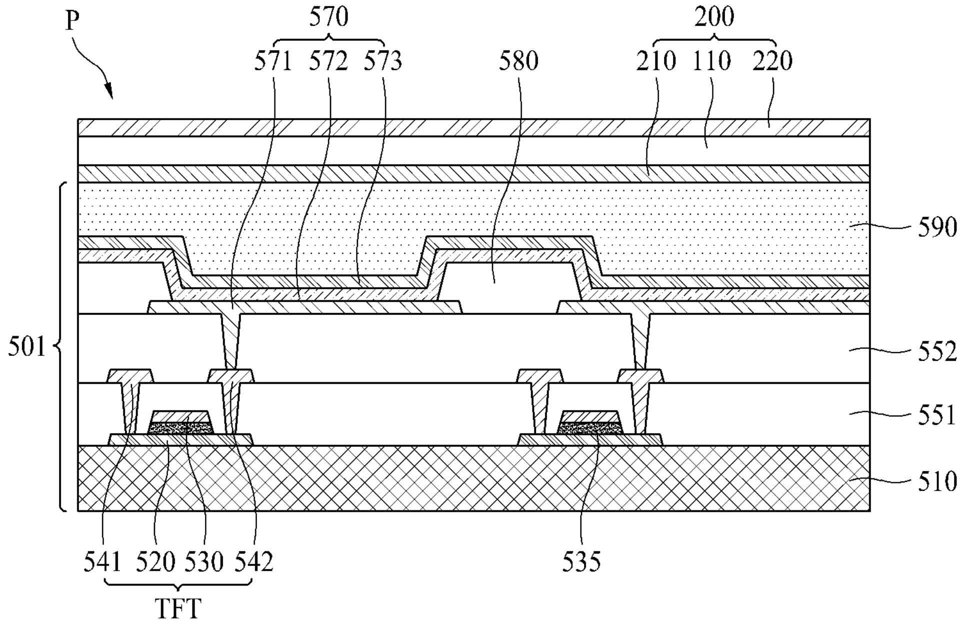
FIG. 6 is an enlarged cross-sectional view illustrating the part "P" of FIG. 5.

FIG. 5 is a cross-sectional view illustrating a part of a display apparatus 500 according to another exemplary embodiment, and FIG. 6 is an enlarged cross-sectional view of part "P" in FIG. 5.

Referring to FIG. 5, the display apparatus 500 according to another embodiment of the present disclosure includes a display panel 501 and a light-transmitting film 200 on the display panel 501. FIG. 5 shows the display apparatus 500 including the light-transmitting film 200 of FIG. 2. However, another embodiment of the present disclosure is not limited thereto, and the light-transmitting film 100 according to FIG. 1, the light-transmitting film 300 according to FIG. 3 and the light-transmitting film 400 according to FIG. 4 may also be applied to the display apparatus 500 according to another embodiment of the present disclosure.

Referring to 5 and 6, the display panel 501 includes a substrate 510, a thin film transistor TFT on the substrate 510, and an organic light-emitting device 570 connected to the thin film transistor TFT. The organic light-emitting device 570 includes a first electrode 571, an organic light-emitting layer 572 on the first electrode 571, and a second electrode 573 on the organic light-emitting layer 572. The display apparatus 500 shown in FIGS. 5 and 6 is an organic light-emitting display apparatus.

The substrate 510 may be formed of plastic. Specifically, the substrate 510 may be formed of a polyimide-based resin or a polyimide-based film.

Although not shown, a buffer layer may be disposed on the substrate 510.

The thin film transistor TFT is disposed on the substrate 510. The thin film transistor TFT includes a semiconductor layer 520, a gate electrode 530 that is insulated from the semiconductor layer 520 and overlaps at least a part of the semiconductor layer 520, a source electrode 541 connected to the semiconductor layer 520, and a drain electrode 542 that is spaced apart from the source electrode 541 and is connected to the semiconductor layer 520.

Referring to FIG. 6, a gate insulating layer 535 is disposed between the gate electrode 530 and the semiconductor layer 520. An interlayer insulating layer 551 may be disposed on the gate electrode 530, and a source electrode 541 and a drain electrode 542 may be disposed on the interlayer insulating layer 551.

A planarization layer 552 is disposed on the thin film transistor TFT to planarize the top of the thin film transistor TFT.

A first electrode 571 is disposed on the planarization layer 552. The first electrode 571 is connected to the drain electrode 542 of the thin film transistor TFT through a contact hole provided in the planarization layer 552.

A bank layer 580 is disposed on the first electrode 571 and the planarization layer 552 to define pixel areas or light-emitting areas. For example, the bank layer 580 is disposed in the form of a matrix at the boundaries between a plurality of pixels to define the respective pixel regions.

The organic light-emitting layer 572 is disposed on the first electrode 571. The organic light-emitting layer 572 may also be disposed on the bank layer 580. The organic light-emitting layer 572 may include one light-emitting layer or two light-emitting layers stacked in a vertical direction. Light having any one color among red, green, and blue may be emitted from the organic light-emitting layer 572, and white light may be emitted therefrom.

The second electrode 573 is disposed on the organic light-emitting layer 572.

The first electrode 571, the organic light-emitting layer 572, and the second electrode 573 may be stacked to constitute the organic light-emitting device 570.

Although not shown, when the organic light-emitting layer 572 emits white light, each pixel may include a color filter for filtering the white light emitted from the organic light-emitting layer 572 based on a particular wavelength. The color filter is formed in the light path.

A thin film encapsulation layer 590 may be disposed on the second electrode 573. The thin film encapsulation layer 590 may include at least one organic layer and at least one inorganic layer, and the at least one organic layer and the at least one inorganic layer may be alternately disposed.

The light-transmitting film 200 is disposed on the display panel 501 having the stack structure described above. The light-transmitting film 100 includes a support layer 110, a first coating layer 210 on the support layer 110, and a second coating layer 220 on the support layer 110 on the side opposite the first coating layer 210.

The light-transmitting film 200 is used as a cover window to cover and protect the light-emitting surface of the display panel 501.

Hereinafter, the present disclosure will be described in more detail with reference to Preparation Examples and Examples. However, the Preparation Examples and Examples should not be construed as limiting the scope of the present disclosure.

Preparation Example 1

1 mol of dichlorodiethylsilane, 1 mol of 4,4'-methylenebis (cyclohexylamine) and 2 mol of triethylamine were injected under a nitrogen atmosphere at −5° C. into a reaction vessel containing 1 L of toluene and dissolved therein. The resulting mixture was stirred at −5° C. for about 30 minutes to prepare a first solution.

1 mol of dichlorodiethylsilane and 2 mol of triethylamine were dissolved under a nitrogen atmosphere at −5° C. in another reaction vessel containing 1 L of toluene, and 1 mol of (3-aminopropyl)triethoxysilane was slowly added thereto over 1 hour. The resulting mixture was stirred at −5° C. for about 30 minutes to prepare a second solution.

The second solution was slowly added to the first solution under a nitrogen atmosphere at −5° C. over 2 hours, and the temperature in the reaction vessel was raised to 30° C. over 2 hours, followed by further stirring for 4 hours. The temperature in the reaction vessel was lowered to 10° C., followed by stirring for 1 day. Chlorine (Cl) generated during the reaction was precipitated in the form of a salt together with triethylamine, and was removed through vacuum filtration.

Then, anhydrous propylene glycol monomethyl ether acetate was added and toluene was removed through vacuum distillation. As a result, a silazane-based compound represented by the following Formula 51 was prepared.

[Formula 51]

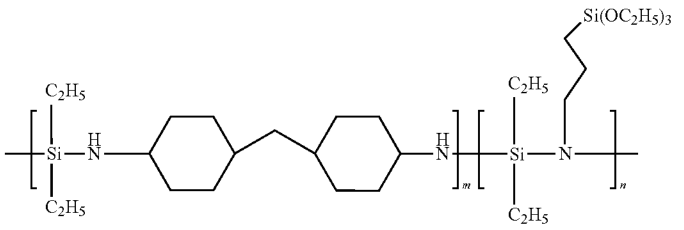

Preparation Example 2

A silazane-based compound represented by Formula 52 was prepared in the same manner as in Preparation Example 1, except that 1 mol of N-2-(aminoethyl)-3-aminopropyltriethoxysilane was used instead of 1 mol of (3-aminopropyl) triethoxysilane.

[Formula 52]

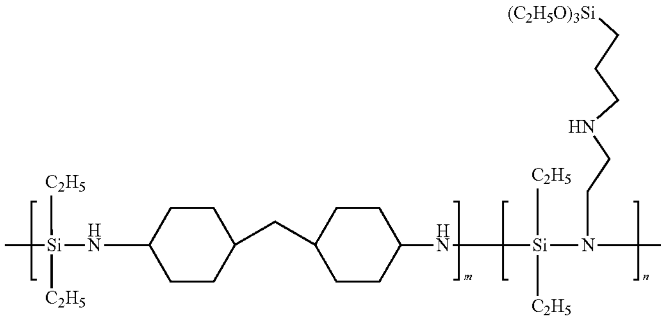

Preparation Example 3

A silazane-based compound represented by Formula 53 was prepared in the same manner as in Preparation Example 1, except that 1 mol of N-2-(aminoethyl)-3-aminopropylmethyldiethoxysilane was used instead of 1 mol of (3-aminopropyl)triethoxysilane.

[Formula 53]

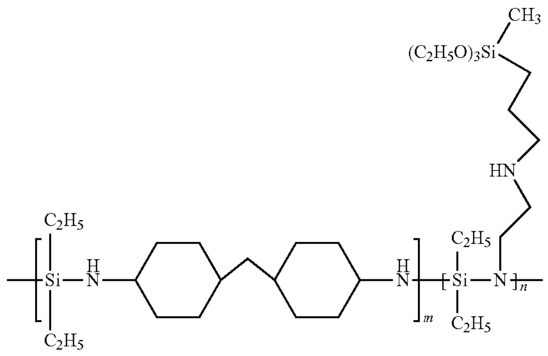

Preparation Example 4

A silazane-based compound represented by Formula 54 was prepared in the same manner as in Preparation Example 1, except that 1 mol of p-phenylenediamine was used instead of 1 mol of 4,4'-methylenebis(cyclohexylamine).

[Formula 54]

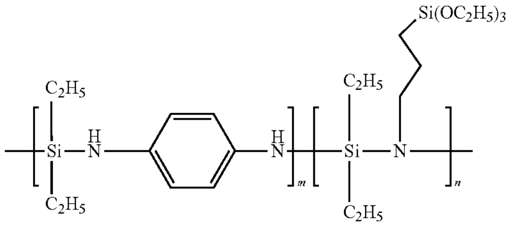

Preparation Example 5

A silazane-based compound represented by Formula 55 was prepared in the same manner as in Preparation Example 1, except that 1 mol of 3-(aminomethyl)-3,5,5-trimethylcyclohexylamine was used instead of 1 mol of 4,4'-methylenebis(cyclohexylamine).

[Formula 55]

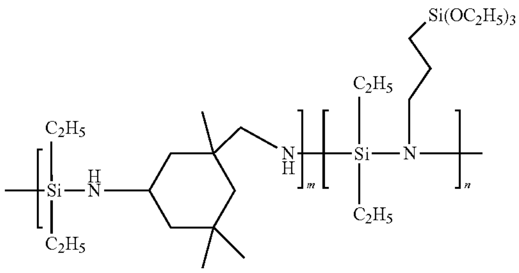

Preparation Example 6

A silazane-based compound represented by Formula 56 was prepared in the same manner as in Preparation Example 1, except that 1 mol of 2,2'-bis(trifluoromethyl)-[1,1'-biphenyl]-4,4'-diamine was used instead of 1 mol of 4,4'-methylenebis(cyclohexylamine).

[Formula 56]

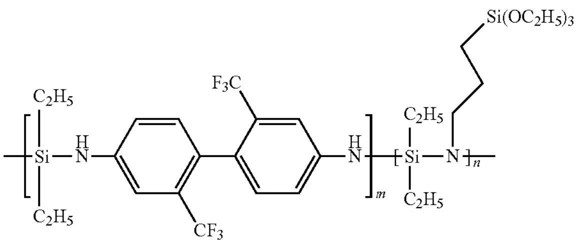

Preparation Example 7

A silazane-based compound represented by Formula 57 was prepared in the same manner as in Preparation Example 1, except that 1 mol of 4,4'-oxydianiline was used instead of 1 mol of 4,4'-methylenebis(cyclohexylamine).

[Formula 57]

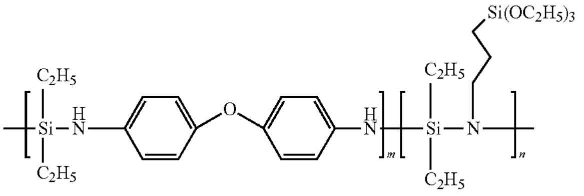

Comparative Preparation Example 1

A silazane-based compound represented by Formula 58 was prepared in the same manner as in Preparation Example 1, except that 1 mol of aniline was used instead of 1 mol of 4,4'-methylenebis(cyclohexylamine).

[Formula 58]

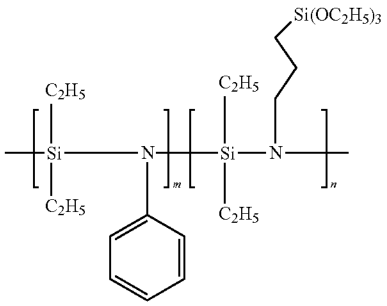

Comparative Preparation Example 2: Preparation of Polysiloxane Solution 0.19 mol of methyltrimethoxysilane, 0.19 mol of vinyltrimethoxysilane and 0.19 mol of tetraethoxysilane were injected into a reaction vessel. The mixture was stirred at 25° C. for 60 minutes.

Then, 2.55 mol of ultrapure water (de-ionized water) (having a specific resistivity of 18 MΩ·cm or more) was slowly added to the mixture over 10 minutes. After the addition was completed, the temperature in the reaction vessel was increased to 30° C. over about 10 minutes, followed by further stirring for 2 hours to hydrate the reaction product. Then, the temperature in the reaction vessel was raised to 80° C. over about 30 minutes, followed by further stirring for 3 hours.

The reaction product was cooled to 30° C. over about 20 minutes, propylene glycol monomethyl ether acetate was added, and vacuum distillation was performed to remove alcohol generated as a reaction by-product. As a result, a silazane-based compound having repeating units represented by Formula 59 was prepared.

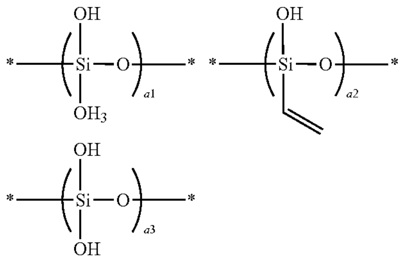

In Formula 59, a1, a2, and a3 each represent the number of repetitions of the repeating unit. a1, a2 and a3 may be substantially the same as one another.

Preparation Example 8: Preparation of Polyimide-Based Film 1-1: Preparation of Polyimide-Based Powder 832 g of N,N-dimethylacetamide (DMAc) was charged in a 1 L reactor equipped with a stirrer, a nitrogen injector, a dropping funnel, a temperature controller, and a cooler, while nitrogen was passed through the reactor, the temperature of the reactor was adjusted to 25° C., 64.046 g (0.2 mol) of 2,2'-bis(trifluoromethyl)benzidine (TFDB) was dissolved therein, and the resulting solution was maintained at 25° C. 31.09 g (0.07 mol) of 2,2-bis(3,4-dicarboxyphenyl) hexafluoropropane dianhydride (6FDA) and 8.83 g (0.03 mol) of biphenyl-tetracarboxylic dianhydride (BPDA) were added thereto, followed by stirring for a predetermined period to induce dissolution and reaction. At this time, the temperature was maintained at 25° C. 20.302 g (0.1 mol) of terephthaloyl chloride (TPC) was added thereto to obtain a polyamic solution having a solid content of 13% by weight.

25.6 g of pyridine and 33.1 g of acetic anhydride were added to the obtained polyamic solution, followed by stirring for 30 minutes and then further stirring at 70° C. for 1 hour. The resulting product was allowed to cool to room temperature, 20 L of methanol was added thereto to precipitate a solid, and the precipitated solid was filtered, pulverized, and then dried at 100° C. in a vacuum for 6 hours to obtain a polyimide-based resin as a powdery solid. The polyimide-based polymer resin powder obtained herein was a polyamide-imide resin powder.

1-2: Preparation of Polyimide-Based Film 100 g of the obtained powdery solid polyimide-based resin was dissolved in 670 g of N,N-dimethylacetamide (DMAc) to obtain a 13 wt % polyimide-based resin solution. The obtained solution was casted to a stainless steel substrate and dried with hot air at 130° C. for 30 minutes to obtain a film, and then the film was peeled off the stainless steel substrate and fixed to a frame with pins.

The frame to which the film was fixed was placed in a vacuum oven and slowly heated from 100° C. to 300° C. over 2 hours, then slowly cooled and the film was separated from the frame to obtain a polyimide-based film. The polyimide-based film was heat-treated at 300° C. for 30 minutes. The polyimide-based film thus prepared was a polyamide-imide film having a thickness of 50 μm, an average light transmittance of 88%, a yellow index of 3.7, and an average coefficient of thermal expansion (CTE), measured at 50 to 250° C. in accordance with the TMA-Method, of 20 ppm/° C.

Example 1

The silazane-based compound prepared in Preparation Example 1 was mixed with anhydrous propylene glycol monomethyl ether acetate as a solvent to prepare a coating composition. At this time, the content of the silazane-based compound as a solid was set to 1.5% by weight based on the total weight of the coating composition. A light-transmitting film 100 was produced using the polyimide-based film produced in Preparation Example 8 as the support layer 110.

Specifically, the prepared composition for coating was applied to the polyimide-based film produced in Preparation Example 8 using a wire coating method, dried at a temperature of 80° C., and heat-treated at a temperature of 250° C. to form a first coating layer 210 having a thickness of 0.01 μm. As a result, the light-transmitting film 100 including the support layer 110 and the first coating layer 210 formed of the polyimide-based film was produced.

Examples 2 to 7

Coating compositions were prepared in the same manner as in Example 1 using the silazane-based compounds prepared in Preparation Examples 2 to 7, light-transmitting films were produced therefrom in the same manner as in Example 1, and these films were respectively designated as Examples 2 to 7.

Comparative Examples 1 and 2

Coating compositions were prepared in the same manner as in Example 1 using the silazane-based compound prepared in Comparative Preparation Examples 1 and 2, light-transmitting films were produced therefrom in the same manner as in Example 1, and these films were respectively designated as Comparative Examples 1 and 2.

Comparative Example 3

The polyimide film produced in Preparation Example 8, which was not coated with anything, was used as a light-transmitting film.

Measurement Example

Physical properties of the light-transmitting films produced in Examples 1 to 7 and Comparative Examples 1 to 3 were measured as follows.

(1) Light transmittance (%): average optical transmittance at a wavelength of 360 to 740 nm was measured in accordance with the ASTM E313 standard using a spectrophotometer (CM-3700D, KONICA MINOLTA).

(2) Yellow index: The yellow index was measured using a spectrophotometer (CM-3700D, KONICA MINOLTA) in accordance with the ASTM E313 standard.

(3) Thermal decomposition (pyrolysis) temperature: the thermal decomposition temperature was measured using a thermogravimetric analyzer (manufacturer: TA instruments, product number: SDT Q600) in accordance with ISO 11358, at a temperature increase rate of 10° C./min within a measurement range of 25 to 400° C. The weight reduction rate of the light-transmitting film produced in Examples 1 to 7 and Comparative Examples 1 and 2, compared to the light-transmitting film of Comparative Example 3, which was not coated with anything, was measured, and the temperature at the point at which the difference in weight reduction rate exceeded 1% was defined as the thermal decomposition (pyrolysis) temperature.

(4) Crosshatch adhesion: Tested in accordance with the adhesion test method of ASTM D3359-02. According to this method, a cut area was created through the film in a crosshatch pattern in a defined space, a tape was applied to the cut area, and then the tape was quickly removed therefrom. The cut area was observed and the extent to which the coating layer was peeled off or removed was observed and determined, and the cut area was scored. The score "5B" is a perfect state, indicating that the coating layer is not removed at all. The score "0B" indicates that 65% or more of the coating layer is removed, and as a result, the adhesion of the coating layer is poor.

(5) Foldability: A sample was prepared by cutting the light-transmitting film into a square with a width of 100 mm×a length of 100 mm. The sample of the light-transmitting film was repeatedly wound and unwound on a cylindrical tool having a diameter of 2 mm 200,000 times at a speed of 10 cm/s, and whether or not the coating layer cracked was visually observed and under a microscope. When the coating layer exhibited any cracking, "Failed" was assigned, and when the coating layer did not exhibit cracking at all, "OK" was assigned.

The results of measurement are shown in Table 1 below.

TABLE 1

| Item | Light trans-mittance | Yellow index | Thermal decompo-sition temper-ature (° C.) | Ad-hesion | Fold-ability |
|---|---|---|---|---|---|
| Example 1 | 90.72 | 0.50 | >400 | 5B | OK |
| Example 2 | 89.44 | 0.88 | >400 | 5B | OK |
| Example 3 | 89.33 | 0.81 | >400 | 5B | OK |
| Example 4 | 89.82 | 0.99 | >400 | 5B | OK |
| Example 5 | 90.01 | 1.14 | >400 | 5B | OK |
| Example 6 | 90.36 | 0.51 | >400 | 3B | OK |
| Example 7 | 89.88 | 0.90 | >400 | 5B | OK |
| Comparative Example 1 | 89.48 | 1.51 | >400 | 5B | OK |
| Comparative Example 2 | 90.40 | 0.55 | >400 | 0B | Failed |
| Comparative Example 3 | 88.79 | 2.51 | — | 5B | OK |

As can be seen from Table 1, the light-transmitting films produced in Examples 1 to 7 had a yellow index of 1.5 or less and a light transmittance of 89% or more.

In addition, as a result of measuring foldability by repeatedly winding and unwinding the light-transmitting film 200,000 times, it can be seen that cracking in the coating layer was not observed even though the coating layer was provided in the light-transmitting film produced in Examples 1 to 7.

EXPLANATION OF REFERENCE NUMERALS

100, 200, 300, 400: Light-transmitting film
110: Support layer
210: First coating layer
220: Second coating layer

The invention claimed is:

1. A silazane-based compound represented by the following Formula 1:

[Formula 1]

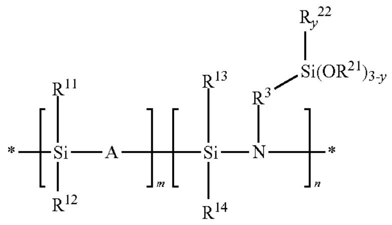

wherein, in Formula 1, $R^{11}$, $R^{12}$, $R^{13}$ and $R^{14}$ are each independently selected from hydrogen, an alkyl group having 1 to 20 carbon atoms, an alkoxy group having 1 to 20 carbon atoms, an aryl group having 6 to 18 carbon atoms, an alkyl acrylate group having 3 to 20 carbon atoms, an alkyl methacrylate group having 4 to 20 carbon atoms, an alkyl vinyl group having 3 to 20 carbon atoms, and a vinyl group, $R^{21}$ is selected from hydrogen, an alkyl group having 1 to 10 carbon atoms, an aryl group having 6 to 18 carbon atoms, and a vinyl group, $R^{22}$ is selected from hydrogen, an alkyl group having 1 to 10 carbon atoms, an aryl group having 6 to 18 carbon atoms, and a vinyl group, $R^3$ is selected from a single bond, an alkylene group having 1 to 10 carbon atoms, an arylene group having 6 to 18 carbon atoms, a substituted alkylene group having 2 to 20 carbon atoms, a substituted arylene group having 7 to 19 carbon atoms, an alkylene vinyl group having 3 to 20 carbon atoms, a vinyl group, and a heteroalkylene group having 1 to 10 carbon atoms, m and n are each an integer of 5 to 150, m/(m+n) is 0.2 to 0.98, y is an integer of 0 to 2, and "A" in Formula 1 is represented by the following Formula 2:

[Formula 2]

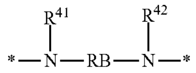

wherein, in Formula 2, $R^{41}$ and $R^{42}$ are each independently selected from hydrogen and an alkyl group having 1 to 4 carbon atoms, and RB is a divalent compound having a cyclic group.

2. The silazane-based compound according to claim 1, wherein RB is represented by any one of the following Formula 3 to Formula 12:

[Formula 3]

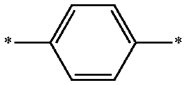

[Formula 4]

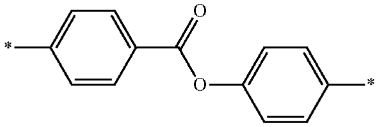

[Formula 5]

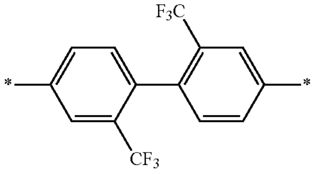

[Formula 6]

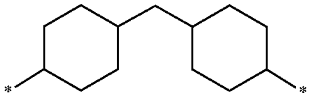

[Formula 7]

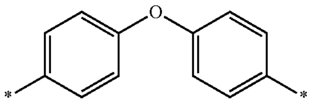

[Formula 8]

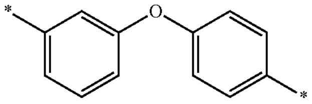

[Formula 9]

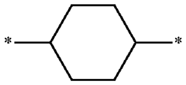

[Formula 10]

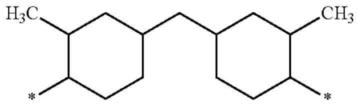

[Formula 11]

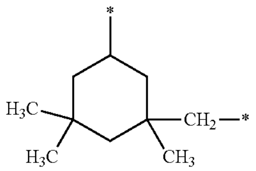

[Formula 12]

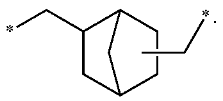

3. The silazane-based compound according to claim 1, wherein, in Formula 1, A is represented by any one of the following Formula 13 to Formula 22:

[Formula 13]

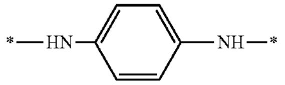

-continued

[Formula 14]

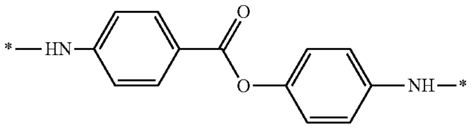

[Formula 15]

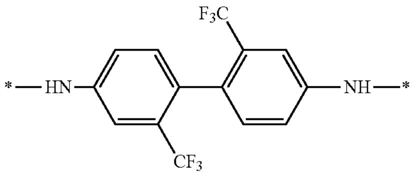

[Formula 16]

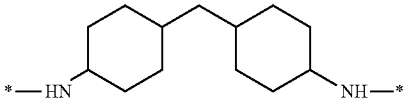

[Formula 17]

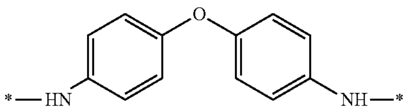

[Formula 18]

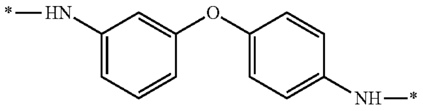

[Formula 19]

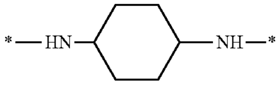

[Formula 20]

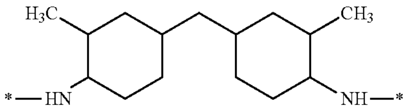

[Formula 21]

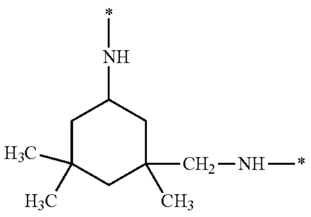

[Formula 22]

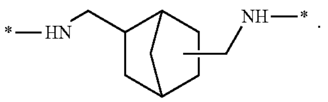

4. The silazane-based compound according to claim 1, wherein Formula 1 is represented by any one of the following Formula 23 to Formula 31:

[Formula 23]

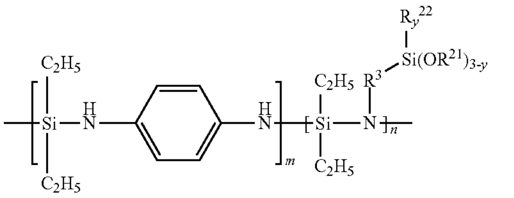

[Formula 24]

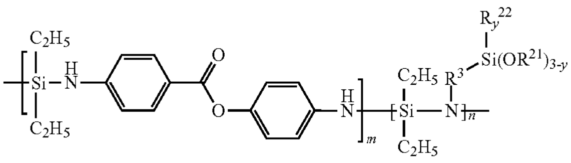

[Formula 25]

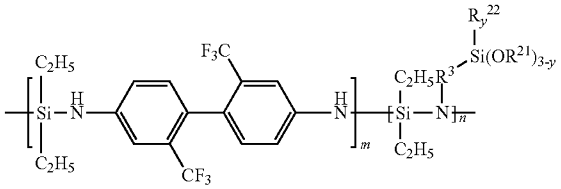

[Formula 26]

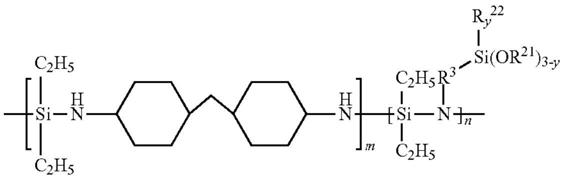

[Formula 27]

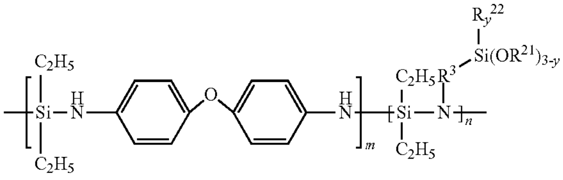

[Formula 28]

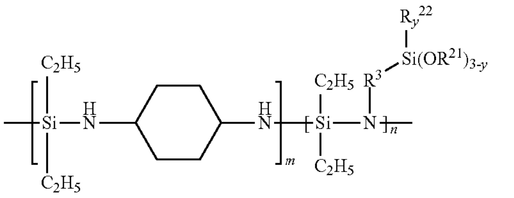

[Formula 29]

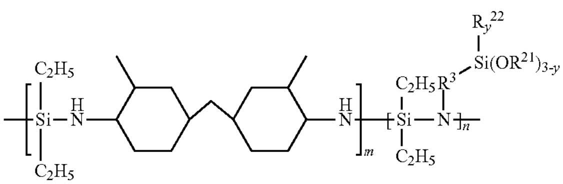

-continued

[Formula 30]

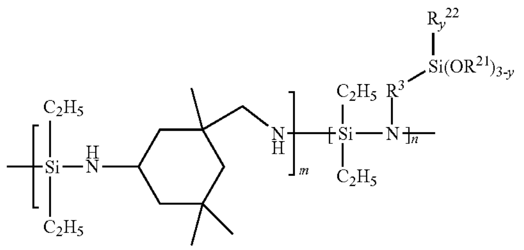

[Formula 31]

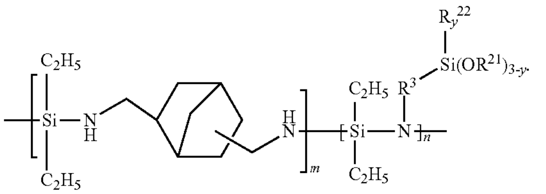

5. The silazane-based compound according to claim 1, wherein $R^3$ is represented by any one of the following Formula 32 to Formula 38:

[Formula 32]

$$*-(CH_2)_{p1}-*$$

[Formula 33]

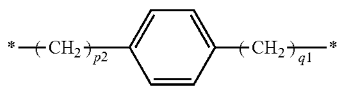

[Formula 34]

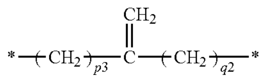

[Formula 35]

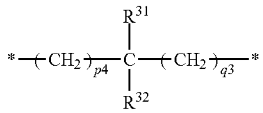

[Formula 36]

$$*-(CH_2)_{p5}-NH-(CH_2)_{q4}-*$$

[Formula 37]

$$*-(CH_2)_{p6}-O-(CH_2)_{q5}-*$$

[Formula 38]

$$*-(CH_2)_{p7}-S-(CH_2)_{q6}-*$$

wherein $p^1$ is an integer from 0 to 10, wherein Formula 32 represents a single bond when $p^1$ is 0, $p^2$, $p^3$, $p^4$, $p^5$, $p^6$, $p^7$, $q^1$, $q^2$, $q^3$, $q^4$, $q^5$ and $q^6$ are each independently an integer of 0 to 6, $R^{31}$ and $R^{32}$ are each independently hydrogen or an alkoxy group having 1 to 5 carbon atoms, and at least one of $R^{31}$ or $R^{32}$ is an alkoxy group having 1 to 5 carbon atoms.

6. The silazane-based compound according to claim 1, wherein the silazane-based compound has a weight average molecular weight (Mw) of 500 to 50,000 g/mol.

7. A coating composition comprising a silazane-based compound represented by the following Formula 1:

[Formula 1]

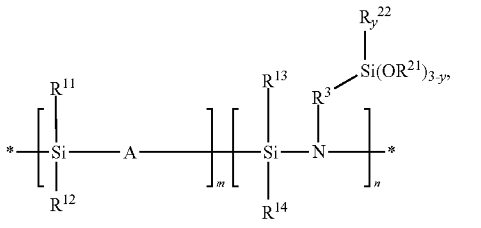

wherein, in Formula 1, $R^{11}$, $R^{12}$, $R^{13}$ and $R^{14}$ are each independently selected from hydrogen, an alkyl group having 1 to 20 carbon atoms, an alkoxy group having 1 to 20 carbon atoms, an aryl group having 6 to 18 carbon atoms, an alkyl acrylate group having 3 to 20 carbon atoms, an alkyl methacrylate group having 4 to 20 carbon atoms, an alkyl vinyl group having 3 to 20 carbon atoms, and a vinyl group, $R^{21}$ is selected from hydrogen, an alkyl group having 1 to 10 carbon atoms, an aryl group having 6 to 18 carbon atoms, and a vinyl group, $R^{22}$ is selected from hydrogen, an alkyl group having 1 to 10 carbon atoms, an aryl group having 6 to 18 carbon atoms, and a vinyl group, $R^3$ is selected from a single bond, an alkylene group having 1 to 10 carbon atoms, an arylene group having 6 to 18 carbon atoms, a substituted alkylene group having 2 to 20 carbon atoms, a substituted arylene group having 7 to 19 carbon atoms, an alkylene vinyl group having 3 to 20 carbon atoms, a vinyl group and a heteroalkylene group having 1 to 10 carbon atoms, m and n are each an integer of 5 to 150, m/(m+n) is 0.2 to 0.98, y is an integer of 0 to 2, and in Formula 1, "A" is represented by the following Formula 2:

[Formula 2]

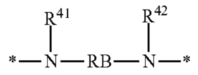

wherein, in Formula 2, $R^{41}$ and $R^{42}$ are each independently selected from hydrogen and an alkyl group having 1 to 4 carbon atoms, and RB is a divalent compound having a cyclic group.

8. A light-transmitting film comprising:

a support layer; and a first coating layer on the support layer, wherein the first coating layer comprises a cured product of a silazane-based compound represented by the following Formula 1:

[Formula 1]

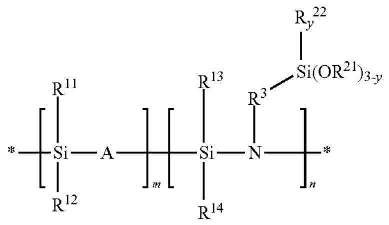

wherein, in Formula 1, $R^{11}$, $R^{12}$, $R^{13}$ and $R^{14}$ are each independently selected from hydrogen, an alkyl group having 1 to 20 carbon atoms, an alkoxy group having 1 to 20 carbon atoms, an aryl group having 6 to 18 carbon atoms, an alkyl acrylate group having 3 to 20 carbon atoms, an alkyl methacrylate group having 4 to 20 carbon atoms, an alkyl vinyl group having 3 to 20 carbon atoms, and a vinyl group, $R^{21}$ is selected from hydrogen, an alkyl group having 1 to 10 carbon atoms, an aryl group having 6 to 18 carbon atoms, and a vinyl group, $R^{22}$ is selected from hydrogen, an alkyl group having 1 to 10 carbon atoms, an aryl group having 6 to 18 carbon atoms, and a vinyl group, $R^3$ is selected from a single bond, an alkylene group having 1 to 10 carbon atoms, an arylene group having 6 to 18 carbon atoms, a substituted alkylene group having 2 to 20 carbon atoms, a substituted arylene group having 7 to 19 carbon atoms, an alkylene vinyl group having 3 to 20 carbon atoms, a vinyl group, and a heteroalkylene group having 1 to 10 carbon atoms, m and n are each an integer of 5 to 150, m/(m+n) is 0.2 to 0.98, y is an integer of 0 to 2, and in Formula 1, "A" is represented by the following Formula 2:

[Formula 2]

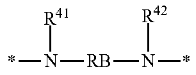

wherein, in Formula 2, $R^{41}$ and $R^{42}$ are each independently selected from hydrogen and an alkyl group having 1 to 4 carbon atoms, and RB is a divalent compound having a cyclic group.

9. The light-transmitting film according to claim 8, wherein RB is represented by any one of the following Formula 3 to Formula 12:

[Formula 3]

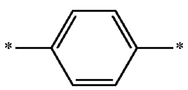

[Formula 4]

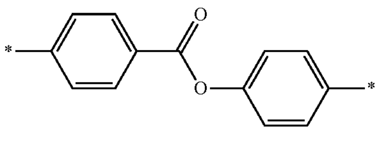

-continued

[Formula 5]

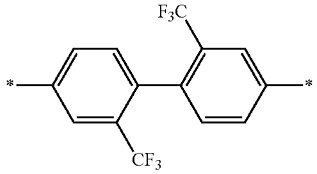

[Formula 6]

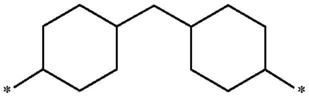

[Formula 7]

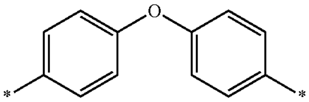

[Formula 8]

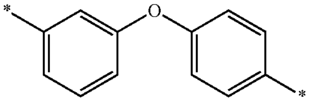

[Formula 9]

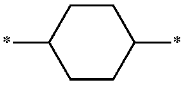

[Formula 10]

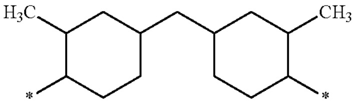

[Formula 11]

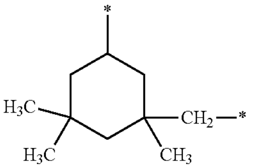

[Formula 12]

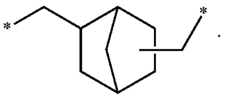

10. The light-transmitting film according to claim 8, wherein $R^3$ is represented by any one of the following Formula 32 to Formula 38:

[Formula 32]

$$*-(CH_2)_{p1}-*$$

[Formula 33]

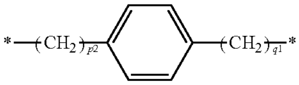

[Formula 34]

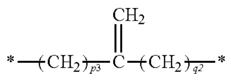

-continued

[Formula 35]

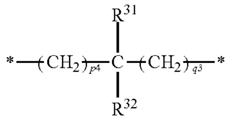

[Formula 36]

$$*-(CH_2)_{p5}-NH-(CH_2)_{q4}-*$$

[Formula 37]

$$*-(CH_2)_{p6}-O-(CH_2)_{q5}-*$$

[Formula 38]

$$*-(CH_2)_{p7}-S-(CH_2)_{q6}-*$$

wherein $p^1$ is an integer from 0 to 10, wherein Formula 32 represents a single bond, when $p^1$ is 0, $p^2$, $p^3$, $p^4$, $p^5$, $p^6$, $p^7$, $q^1$, $q^2$, $q^3$, $q^4$, $q^5$ and $q^6$ are each independently an integer of 0 to 6, $R^{31}$ and $R^{32}$ are each independently hydrogen or an alkoxy group having 1 to 5 carbon atoms, and at least one of $R^{31}$ or $R^{32}$ is an alkoxy group having 1 to 5 carbon atoms.

11. The light-transmitting film according to claim 8, wherein the silazane-based compound has a weight average molecular weight (Mw) of 500 to 50,000 g/mol.

12. The light-transmitting film according to claim 8, wherein the first coating layer has a thickness of 0.02 to 10 μm.

13. The light-transmitting film according to claim 8, wherein the light-transmitting film has a yellow index of 1.5 or less.

14. The light-transmitting film according to claim 8, further comprising a second coating layer on the support layer, wherein the second coating layer comprises a reaction product of a compound represented by the following Formula 39 and a compound represented by the following Formula

[Formula 39]

$$R^5_K-Si-(OR^6)_{4-k}$$

[Formula 40]

$$M-(OR^7)_j$$

wherein $R^5$ in Formula 39 is derived from any one of linear, branched, alicyclic, and aromatic organic compounds containing at least one of an epoxy group, an acrylic group, or an isocyanate group, each of $R^6$ in Formula 39 and $R^7$ in Formula 40 is a $C_1$ to $C_8$ linear, branched or alicyclic heteroalkyl group, M in Formula 40 is a metal element, k in Formula 39 is an integer of 1 to 3, and j in Formula 40 is an integer of 1 to 10.

15. A display apparatus comprising:

a display panel; and the light-transmitting film according to claim 8 disposed on the display panel.

* * * * *